United States Patent
Ohori et al.

(10) Patent No.: US 10,904,006 B2
(45) Date of Patent: Jan. 26, 2021

(54) METHOD AND APPARATUS FOR CRYPTOGRAPHIC DATA PROCESSING

(71) Applicant: FUJITSU LIMITED, Kawasaki (JP)

(72) Inventors: Ryuichi Ohori, Kawasaki (JP); Takeshi Shimoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 15/830,506

(22) Filed: Dec. 4, 2017

(65) Prior Publication Data
US 2018/0174493 A1 Jun. 21, 2018

(30) Foreign Application Priority Data
Dec. 16, 2016 (JP) ................................. 2016-244630

(51) Int. Cl.
*H04L 9/32* (2006.01)
*H04L 9/08* (2006.01)
*H04L 9/30* (2006.01)
*H04L 9/06* (2006.01)

(52) U.S. Cl.
CPC .......... *H04L 9/3231* (2013.01); *H04L 9/0656* (2013.01); *H04L 9/0866* (2013.01); *H04L 9/0869* (2013.01); *H04L 9/304* (2013.01); *H04L 2209/04* (2013.01); *H04L 2209/08* (2013.01); *H04L 2209/34* (2013.01)

(58) Field of Classification Search
CPC ... H04L 9/0861; H04L 9/0866; H04L 9/0869; H04L 9/304; H04L 9/3231; H04L 2209/04; H04L 2209/34
See application file for complete search history.

(56) References Cited

U.S. PATENT DOCUMENTS 8,868,923 B1 10/2014 Hamlet et al.
9,565,022 B1 * 2/2017 Robshaw ................ H04L 63/06
10,454,677 B1 * 10/2019 Nagelberg ............ H04L 9/0866
(Continued)

FOREIGN PATENT DOCUMENTS

JP 2001-007802 1/2001
JP 2007-148470 6/2007

OTHER PUBLICATIONS

Ari Juels et al., "A Fuzzy Commitment Scheme", Proceedings of the 6th ACM conference on Computer and Communications Security (CCS '99), pp. 28-36, Nov. 1-4, 1999 (10 pages).
(Continued)

*Primary Examiner* — Jeremy S Duffield
(74) *Attorney, Agent, or Firm* — Fujitsu Patent Center

(57) ABSTRACT

A mask is selected amongst a plurality of masks. A first masked random number is generated by converting a first random number using the selected mask, and a first key is generated from the first masked random number and a first biometric code generated from biometric information. In addition, mask information indicating the selected mask is stored. A second masked random number is generated by converting a second random number using the selected mask or a different mask having a predetermined relationship with the selected mask, and a second key is generated from the second masked random number and a second biometric code. A ciphertext is generated using one of the first key and the second key and an error-correction encoding method.

6 Claims, 14 Drawing Sheets

(56) References Cited

U.S. PATENT DOCUMENTS

| | | |
|---|---|---|
| 2005/0229009 A1 | 10/2005 | Fujii et al. |
| 2007/0118758 A1 | 5/2007 | Takahashi et al. |
| 2009/0016535 A1* | 1/2009 | Cowburn .............. H04L 9/0618 380/277 |
| 2014/0006797 A1* | 1/2014 | Cordella ............. G06F 21/6209 713/189 |

OTHER PUBLICATIONS

Yasuda, Masaya et al., "Privacy-Preserving Fuzzy Commitment for Biometrics via Layered Error-Correcting Codes", Feb. 25, 2016, ECCV 2016 Conference, Lecture Noted in Computer Science, Springer International Publishing, pp. 117-133, XP047344739.
Extended European Search Report dated May 8, 2018 for corresponding European Patent Application No. 17206142.6, 5 pages.

* cited by examiner

TEMPLATE TABLE

| IDENTIFICATION INFORMATION | CIPHERTEXT c | HASH VALUE h(p) | MASK M |
|---|---|---|---|
| 1200-3456 | 0110001101110100... | 1100101001011101... | 0010000100011000... |
| ⋮ | ⋮ | ⋮ | ⋮ |

FIG. 6

TEMPLATE TABLE

| IDENTIFICATION INFORMATION | DECRYPTION KEY k | SMALL MASK m |
|---|---|---|
| 1200-3456 | 0110001101110100... | 0010000100011000... |
| ⋮ | ⋮ | ⋮ |

METHOD AND APPARATUS FOR CRYPTOGRAPHIC DATA PROCESSING

CROSS-REFERENCE TO RELATED APPLICATION

This application is based upon and claims the benefit of priority of the prior Japanese Patent Application No. 2016-244630, filed on Dec. 16, 2016, the entire contents of which are incorporated herein by reference.

FIELD

The embodiments discussed herein are related to a method and apparatus for cryptographic data processing.

BACKGROUND

Biometric information is currently one of the measures used in cryptographic processing, for example, for the purpose of protection of confidential information and user authentication. Biometric information is information about physical or behavioral characteristics of an individual. Physical characteristics include, for example, a fingerprint, veins, and an iris. Handwriting is an example of behavioral characteristics. Common cryptographic processing using biometric information generates a key through the use of a biometric code generated from biometric information and performs encoding and decoding using the generated key.

For example, in the case of protecting confidential information, an encryption key is generated from a biometric code acquired at the time of encoding (for example, a biometric code generated from a fingerprint or vein image taken at the time of encoding), and the confidential information is encoded using the generated encryption key. Then, a decryption key is generated from a biometric code acquired at the time of decoding (for example, a biometric code generated from a fingerprint or vein image taken at the time of decoding), and then used to decode a ciphertext. In the case of user authentication, for example, an encryption key is generated from a biometric code acquired at the time of user registration, and a template is generated using the generated encryption key and then stored in an authentication database. Subsequently, a decryption key is generated from a biometric code acquired at the time of authentication and then used to decode the template. The identity of the user is verified when the template is decoded correctly.

Note that biometric codes have high distinguishability so that ones acquired from the same person even at different times are sufficiently similar to each other while ones acquired from different people indicate heterogeneous characteristics. Such biometric codes are not easy to change when they are leaked unlike discretionally selectable user identifiers and passwords. For this reason, it is preferable to reduce the risk of biometric codes being leaked from a cryptographic data processing system. Based on this perspective, biometric encoding schemes, such as a fuzzy commitment scheme, have been proposed.

The proposed fuzzy commitment scheme error-correction encodes confidential information and adds, to the generated code, a biometric code acquired at the time of encoding to thereby generate a ciphertext. Then, a biometric code acquired at the time of decoding is subtracted from the ciphertext and the subtraction result is error-correction decoded to thereby decode the ciphertext. In the case where there is a small difference between the biometric codes used in the encoding and decoding, the difference is considered as minor noise and removed during the error-correction decoding and the confidential information is then successfully restored. On the other hand, if the two differ greatly from each other, the error-correction decoding fails due to the large noise and no restoration of the confidential information is performed.

A remote authentication system has been proposed that securely transmits authentication information between an encryption apparatus and a decryption apparatus in user authentication using biometric information. The encryption apparatus of the proposed remote authentication system determines a numerical key for each encoding; generates an encryption key from the determined numerical key and a predetermined primary key; encodes biometric information using the encryption key; and transmits authentication information including the encoded biometric information and decoding control information indicating the numerical key used. The decryption apparatus of the remote authentication system restores the numerical key from the decoding control information; generates a decryption key from the restored numerical key and a predetermined primary key; and decodes the encoded biometric information using the decryption key.

In addition, there is a proposed biometric authentication system with reduced registration cost. The proposed biometric authentication system generates master auxiliary information from biometric information acquired at the time of registration and writes it to an integrated circuit (IC). The biometric authentication system generates a registration password and registers it in an authentication server, and also generates auxiliary information corresponding to the registration password by converting the master auxiliary information and stores the auxiliary information in an authentication terminal. According to the biometric authentication system, the authentication terminal generates an authentication password from biometric information acquired at the time of authentication and the auxiliary information stored in the authentication terminal, and the authentication server then checks the authentication password against the registration password.

Japanese Laid-open Patent Publication No. 2001-7802
Japanese Laid-open Patent Publication No. 2007-148470
Ari Juels and Martin Wattenberg, "A fuzzy commitment scheme", Proceedings of the 6th ACM (Association for Computing Machinery) conference on Computer and Communications Security, pp. 28-36, 1999

There are some cases where different confidential information sets pertaining to the same person are desired to be independently encoded and thereby protected, for example, when the same person registers with a plurality of authentication systems. However, under conventional cryptographic processing technology using biometric information, a ciphertext may accidentally be decoded using a decryption key for decoding a different ciphertext due to similarity among a plurality of keys generated from biometric information of the same person. Therefore, for example, if a decryption key for decoding a confidential information set is leaked, the decryption key may be fraudulently used, and a different confidential information set pertaining to the same person may then also be leaked. In addition, for example, if a decryption key used for an authentication system is leaked, the decryption key may be fraudulently used and an unauthorized login to a different authentication system may then be successful.

SUMMARY

According to an aspect, there is provided a cryptographic data processing method including selecting a first mask amongst a plurality of masks; generating a first masked random number by converting a first random number using the first mask and generating a first key from the first masked random number and a first biometric code generated from biometric information, and also causing mask information indicating the selected first mask to be stored; generating a second masked random number by converting a second random number using the first mask indicated by the mask information or a second mask having a predetermined relationship with the first mask, and generating a second key from the second masked random number and a second biometric code; and generating a ciphertext using one of the first key and the second key and an error-correction encoding method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a first template table;

FIG. 11 illustrates an example of a second template table;

DESCRIPTION OF EMBODIMENTS

Figure 1:
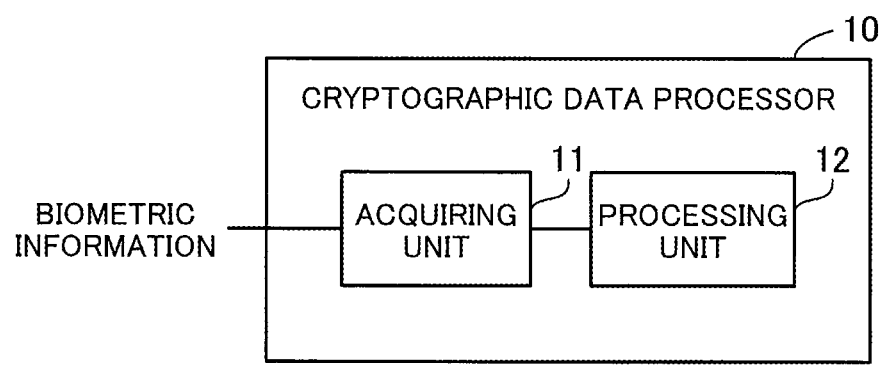
FIG. 1 is a block diagram illustrating an example of a cryptographic data processor according to a first embodiment.

Several embodiments will be described below with reference to the accompanying drawings. In the following description and the accompanying drawings, like reference numerals refer to like elements having substantially the same functions, and a repeated description thereof may be omitted.

(a) First Embodiment

FIG. 1 is a block diagram illustrating an example of a cryptographic data processor according to a first embodiment. A cryptographic data processor 10 of the first embodiment is a security device that carries out cryptographic processing using biometric information. The cryptographic data processor 10 is, for example, used in an information processing system for encoding confidential information and storing it therein or an authentication system for implementing user authentication. The cryptographic data processor 10 may be a client device, such as a client computer, a terminal unit, or a server device, such as a server computer.

The cryptographic data processor 10 includes an acquiring unit 11 and a processing unit 12. The acquiring unit 11 acquires biometric information of a user. The biometric information indicates a physical characteristic such as a fingerprint, veins, or an iris, or a behavioral characteristic such as handwriting. The acquiring unit 11 may be an input device, such as an image pickup device or a touch panel; an input interface connected to an input device; or a communication interface that receives biometric information from a different device equipped with an input device. The processing unit 12 is, for example, a processor such as a central processing unit (CPU) or a digital signal processor (DSP). Note however that, the processing unit 12 may include an electronic circuit designed for specific use, such as an application specific integrated circuit (ASIC) or a field programmable gate array (FPGA). The processor executes programs stored in memory, such as random access memory (RAM). The programs include a cryptographic data processing program. The term "processor" here also refers to a set of multiple processors.

Figure 2:
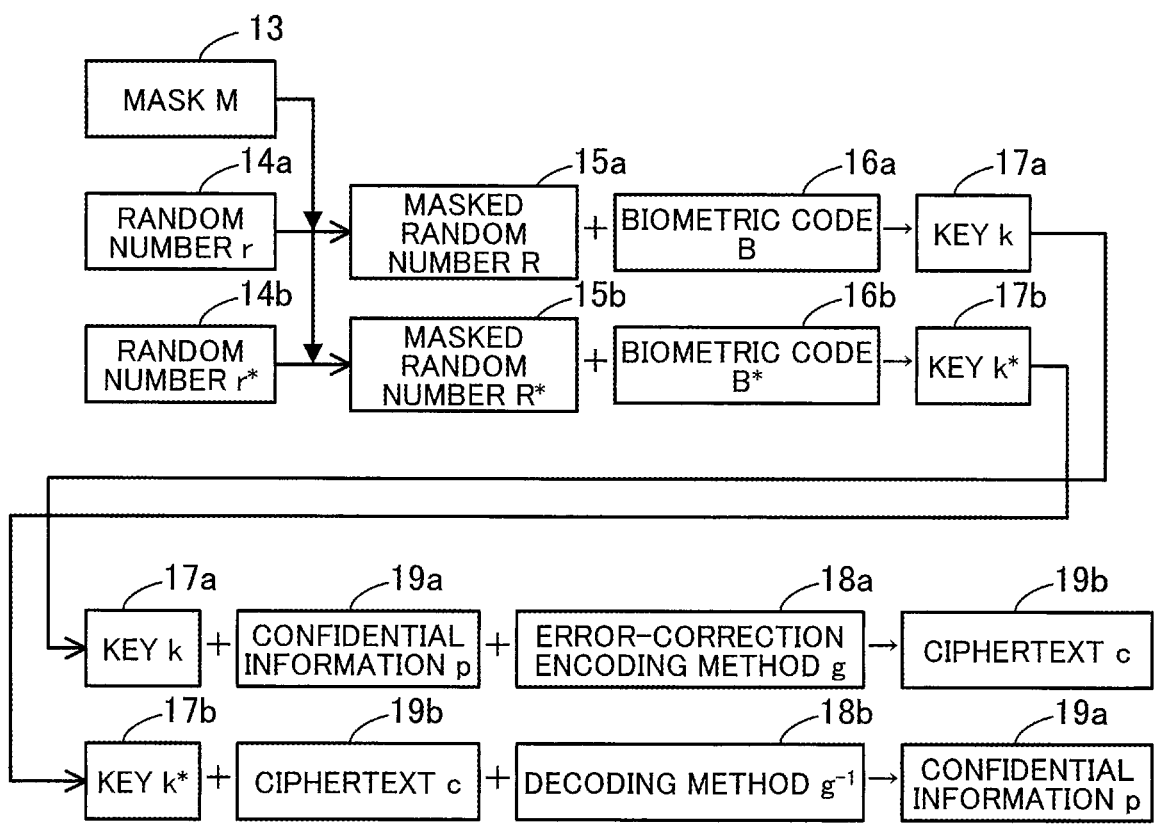
FIG. 2 illustrates an example of data conversions according to the first embodiment.

FIG. 2 illustrates an example of data conversions according to the first embodiment. The processing unit 12 selects a mask 13 amongst a plurality of masks satisfying a predetermined condition. The number of nonzero bits in each mask is preferably greater than the correctable bit count of an error-correction encoding method 18a described below but equal to or less than a bit count obtained by adding 1 to twice the correctable bit count.

The processing unit 12 selects a random number 14a, and converts the random number 14a using the mask 13 to thereby generate a masked random number 15a. The conversion from the random number 14a to the masked random number 15a is a masking operation using the mask 13 and, for example, an operation of performing a bitwise AND of the mask 13 and the random number 14a. The processing unit 12 generates a key 17a from the masked random number 15a and a biometric code 16a which is generated from biometric information. For example, the processing unit 12 encodes the masked random number 15a using an error-correction encoding method different from the error-correction encoding method 18a and then synthesizes the encoded result and the biometric code 16a to thereby generate the key 17a. The different error-correction encoding method is preferably a linear coding method. The synthesis of the encoded result and the biometric code 16a is, for example, an operation of performing a bitwise exclusive OR of the two.

The processing unit 12 causes mask information indicating the above-mentioned selected mask 13 to be stored. The mask information may be the mask 13 itself, or indirect information allowing the mask 13 to be identified through calculation. The processing unit 12 may store the mask information in a storing unit of the cryptographic data processor 10 or cause a different device to store the mask information.

After generating the key 17a, the processing unit 12 selects a random number 14b, and converts the random number 14b using the mask 13 indicated by the mask information or a different mask having a predetermined relationship with the mask 13 to thereby generate a masked random number 15*b*. The conversion from the random number 14*b* to the masked random number 15*b* is a masking operation using the mask 13 or the foregoing different mask and, for example, an operation of performing a bitwise AND of the mask 13, or the different mask, and the random number 14*b*. The processing unit 12 generates a key 17*b* from the masked random number 15*b* and a biometric code 16*b* which is generated from biometric information.

For example, the processing unit 12 encodes the masked random number 15*b* using the foregoing different error-correction encoding method and then synthesizes the encoded result and the biometric code 16*b* to thereby generate the key 17*b*. The synthesis of the encoded result and the biometric code 16*b* is, for example, an operation of performing a bitwise exclusive OR of the two. The biometric information used to generate the key 17*b* may be different from the biometric information used to generate the key 17*a*, and may be acquired, for example, after the generation of the key 17*a*.

Note that one of the keys 17*a* and 17*b* is used as an encryption key while the other one is used as a decryption key. The processing unit 12 encodes confidential information 19*a* using the encryption key and the error-correction encoding method 18*a* to thereby generate a ciphertext 19*b*. For example, the processing unit 12 generates the ciphertext 19*b* by encoding the confidential information 19*a* using the error-correction encoding method 18*a*, then further encoding the encoded result using the foregoing different error-correction encoding method, and synthesizing the secondly encoded result and the encryption key. The synthesis of the secondly encoded result and the encryption key is, for example, an operation of performing a bitwise exclusive OR of the two.

In the case where the key 17*a* is the encryption key, for example, the processing unit 12 generates the key 17*a* and then generates the ciphertext 19*b* before generating the key 17*b*. In the case where the key 17*b* is the encryption key, the processing unit 12 generates the keys 17*a* and 17*b* and then the ciphertext 19*b*. The cryptographic data processor 10 may store the ciphertext 19*b* and the decryption key in a storing unit of the cryptographic data processor 10 or transmit them to a different device.

The processing unit 12 causes the ciphertext 19*b* to be decoded using the decryption key and a decoding method 18*b* corresponding to the error-correction encoding method 18*a*. The processing unit 12 may decode the ciphertext 19*b* or cause a different device to decode the ciphertext 19*b*. In the decoding of the ciphertext 19*b*, for example, the ciphertext 19*b* and the decryption key are synthesized together; the synthesized result is decoded using a different decoding method corresponding to the foregoing different error-correction encoding method; and the decoded result is further decoded using the decoding method 18*b*. The synthesis of the ciphertext 19*b* and the decryption key is, for example, an operation of performing a bitwise exclusive OR of the two.

Note that, in the case of decoding the ciphertext 19*b* using the decoding method 18*b* and the foregoing different decoding method, a plurality of decoding paths including first and second decoding paths may be implemented. In the first decoding path, the decoded result obtained by the foregoing different decoding method is directly decoded using the decoding method 18*b*. In the second decoding path, the decoded result obtained by the foregoing different decoding method is synthesized with the mask 13 or the above-mentioned different mask, and the synthesized result is then decoded using the decoding method 18*b*. In this case, at most one out of a plurality of decoded results generated in the decoding paths is correct.

According to the cryptographic data processor 10 of the first embodiment, decoding of the ciphertext 19*b* is successful if biometric information of the same person for whom the encryption key has been formed is used in the generation of the decryption key; however, decoding of the ciphertext 19*b* is unsuccessful if biometric information of a different person is used. In addition, decoding of the ciphertext 19*b* is successful if the same mask used for the encryption key, or a mask corresponding to the mask used for the encryption key, is used to generate the decryption key. This is because, when the random numbers 14*a* and 14*b* are limited by the same or corresponding mask, the difference between the masked random numbers 15*a* and 15*b* results in minor noise to be correctable by the decoding method 18*b*. On the other hand, if a mask unrelated to the encryption key is used to generate the decryption key, decoding of the ciphertext 19*b* is unsuccessful. This is because the difference between the masked random numbers 15*a* and 15*b* leads to significant noise to be uncorrectable by the decoding method 18*b*.

Therefore, it is possible to enhance the protection of a plurality of ciphertexts pertaining to the same person by applying different masks to the ciphertexts. For example, even if a decryption key for decoding a ciphertext is leaked, decoding of other ciphertexts pertaining to the same person is not possible because of different masks being used.

(b) Second Embodiment

Figure 3:
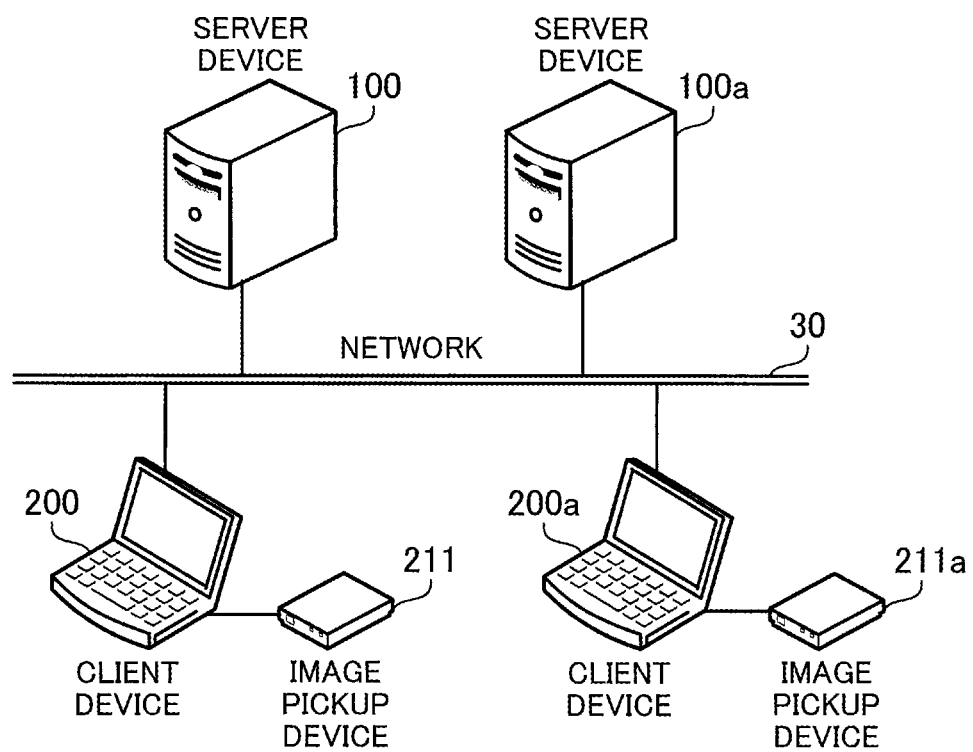
FIG. 3 illustrates an example of a cryptographic data processing system according to a second embodiment.

FIG. 3 illustrates an example of a cryptographic data processing system according to a second embodiment. The cryptographic data processing system of the second embodiment is an information processing system that carries out cryptographic processing using biometric information. This cryptographic data processing system includes server devices 100 and 100*a* and client devices 200 and 200*a*. The server devices 100 and 100*a* and the client devices 200 and 200*a* are individually connected to a network 30. The network 30 may be a local area network (LAN), or a broad area network such as the Internet. The server devices 100 and 100*a* and the client devices 200 and 200*a* may be installed at the same facility, or distributed across different facilities. The server devices 100 and 100*a* may be installed at a dedicated information processing facility, such as a datacenter.

The server devices 100 and 100*a* are server computers for managing encoded confidential information. The server devices 100 and 100*a* manage confidential information independently of one another. Each of the server devices 100 and 100*a* may manage different confidential information of the same user. The server devices 100 and 100*a* may be authentication devices for implementing user authentication (biometric authentication) using biometric information and confidential information. In addition, the server devices 100 and 100*a* may be individually run by different organizations. For example, the server devices 100 and 100*a* may individually belong to authentication systems of different organizations.

The client devices 200 and 200*a* are terminal units operated by users. The client devices 200 and 200*a* may be personal terminal units used only by specific users, such as personal computers (PCs) and portable terminal units, or shared terminals used by unspecified users, such as automated teller machines (ATMs). To the client device 200, an image pickup device 211 is connected. To the client device 200*a*, an image pickup device 211*a* is connected. Each of the image pickup devices 211 and 211a takes a biometric image representing a physical or behavioral characteristic of the user. Physical characteristics include a fingerprint, veins, and an iris. Behavioral characteristics include handwriting. Each of the client devices 200 and 200a may determine in advance the type of characteristic used in its cryptographic processing. In this case, the image pickup devices 211 and 211a may have a particular shape according to the type of characteristic so as to efficiently take a biometric image representing the predetermined characteristic. For example, in the case of using a vein pattern in the cryptographic processing, the image pickup devices 211 and 211a may individually have a shape easy to take an image of the palm of the hand.

At the time of encoding, each of the client devices 200 and 200a (hereinafter simply referred to as the "client device 200/200a") acquires a biometric image of the user using the image pickup device connected thereto and generates a biometric code from the biometric image. The biometric code is a code representing characteristic information extracted from the biometric image. The client device 200/200a generates an encryption key using the generated biometric code, and encodes confidential information given by the user using the encryption key to thereby generate a ciphertext. The client device 200/200a transmits the generated ciphertext to one of the server devices 100 and 100a. At the time of decoding, the client device 200/200a acquires a biometric image of the user using the image pickup device connected thereto and generates a biometric code from the biometric image. The client device 200/200a generates a decryption key using the generated biometric code and transmits the decryption key to one of the server devices 100 and 100a.

Assume mainly that, in the second embodiment, biometric authentication is implemented using the server devices 100 and 100a and the client devices 200 and 200a. At the time of user registration, the client device 200/200a transmits a template including a ciphertext to one of the server devices 100 and 100a. The template is data to be referenced in verifying the identity of the user. Protection is provided to each biometric code in such a manner that, even if a template is leaked, a biometric code is not extracted from the template. Upon receiving a template, each of the server devices 100 and 100a (hereinafter simply referred to as the "server device 100/100a") saves the received template in a database. The server devices 100 and 100a may be individually provided with the database, or the database is hosted externally to the server devices 100 and 100a.

At the time of user authentication, the client device 200/200a transmits a decryption key to one of the server devices 100 and 100a. Upon receiving the decryption key, the server device 100/100a extracts a ciphertext from the template stored in the database and tries to decode the ciphertext using the received decryption key. The server device 100/100a determines that authentication succeeds when the decoding of the ciphertext is successful, and returns an authentication result indicating authentication success. On the other hand, the server device 100/100a determines that authentication fails when the decoding of the ciphertext is unsuccessful, and returns an authentication result indicating authentication failure.

Upon receiving an authentication result, the client device 200/200a controls a user interface according to the authentication result. In the case of authentication success, for example, the client device 200/200a presents an authentication success message on a display and allows access to all services provided by the client device 200/200a. In the case of authentication failure, on the other hand, for example, the client device 200/200a presents an authentication failure message on the display and denies access to all or part of the services provided by the client device 200/200a.

Note that the registration and authentication may be made on the same or different client devices. That is, the encryption key and the decryption key may be generated using either the same or different client devices. For example, a user may use the client device 200 for registration and then use the client device 200a for authentication. Alternatively, the client device 200 may be used as a client device dedicated for registration while the client device 200a may be used as a client device dedicated for authentication.

Figure 4:
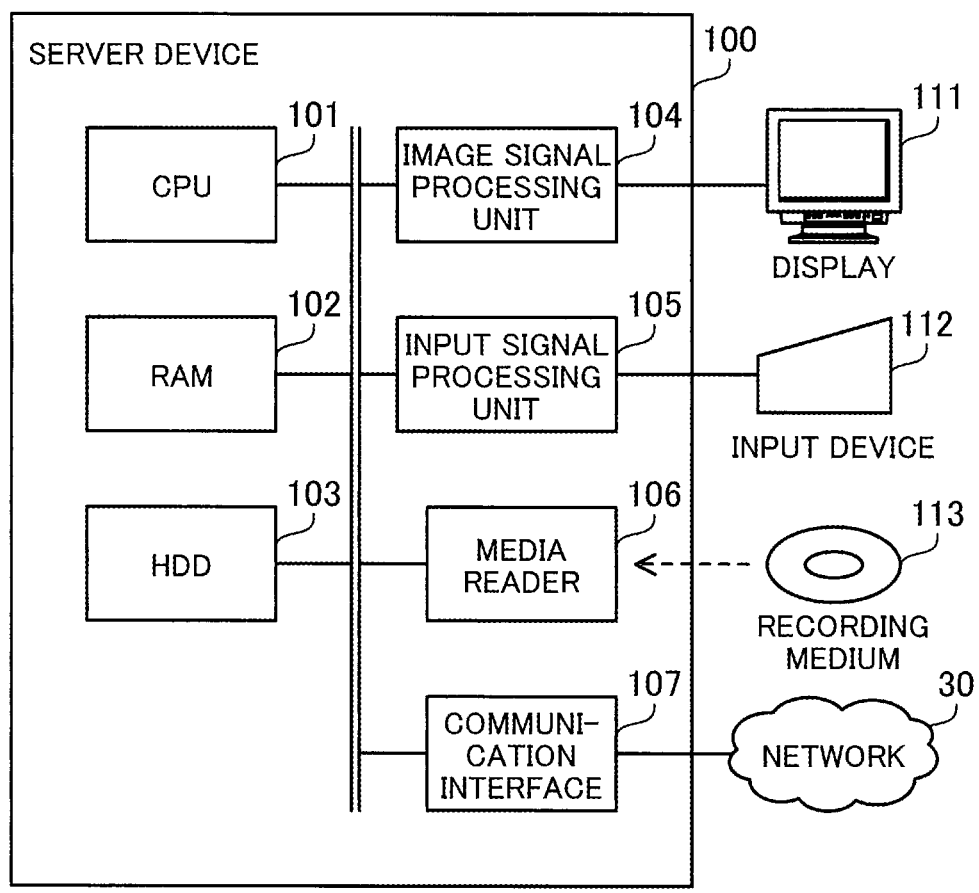
FIG. 4 is a block diagram illustrating an example of hardware of a server device.

FIG. 4 is a block diagram illustrating an example of hardware of a server device. The server device 100 includes a CPU 101, RAM 102, a hard disk drive (HDD) 103, an image signal processing unit 104, an input signal processing unit 105, a media reader 106, and a communication interface 107. These units of the server device 100 are connected to a bus. The CPU 101 is a processor including a computing circuit for carrying out program instructions. The CPU 101 loads at least part of a program and data stored in the HDD 103 into the RAM 102 to execute the program. Note that the CPU 101 may include a plurality of processor cores and the server device 100 may include a plurality of processors, and processes to be described later may be executed in parallel using the plurality of processors or processor cores. In addition, a set of a plurality of processors may be referred to as the "multiprocessor" or "processor".

The RAM 102 is volatile semiconductor memory for temporarily storing therein programs to be executed by the CPU 101 and data to be used by the CPU 101 for its computation. Note that the server device 100 may be provided with a different type of memory other than RAM, or may be provided with a plurality of memory devices. The HDD 103 is a non-volatile memory device to store therein software programs, such as an operating system (OS), middleware, and application software, and various types of data. The programs include a cryptographic data processing program. Note that the server device 100 may be provided with a different type of memory device, such as flash memory or a solid state drive (SSD), or may be provided with a plurality of non-volatile memory devices.

The image signal processing unit 104 outputs an image on a display 111 connected to the server device 100 according to an instruction from the CPU 101. Various types of displays including the following may be used as the display 111: a cathode ray tube (CRT) display; a liquid crystal display (LCD); a plasma display panel (PDP); and an organic electro-luminescence (OEL) display. The input signal processing unit 105 acquires an input signal from an input device 112 connected to the server device 100 and sends the input signal to the CPU 101. Various types of input devices including the following may be used as the input device 112: a pointing device, such as a mouse, a touch panel, a touch-pad, and a trackball; a keyboard; a remote controller; and a button switch. In addition, a plurality of types of input devices may be connected to the server device 100.

The media reader 106 is a reader for reading programs and data recorded in a storage medium 113. As the storage medium 113, any of the following may be used: a magnetic disk, an optical disk, a magneto-optical disk (MO), and semiconductor memory. Examples of the magnetic disk include a flexible disk (FD) and a HDD. Examples of the optical disk are a compact disc (CD) and a digital versatile disc (DVD). The media reader 106 copies the programs and data read from the storage medium 113 to a different storage medium, for example, the RAM 102 or the HDD 103. The read programs are executed, for example, by the CPU 101. Note that the storage medium 113 may be a portable storage medium, and may be used to distribute the programs and data. In addition, the storage medium 113 and the HDD 103 are sometimes referred to as computer-readable storage media.

The communication interface 107 is connected to the network 30 and communicates with the client devices 200 and 200a via the network 30. The communication interface 107 may be a wired communication interface connected via a cable to a communication device, such as a switch, or a wireless communication interface connected via a wireless link to a base station.

Each of the server device 100a and the client devices 200 and 200a may be implemented using components of hardware that are similar to those of the server device 100. Note however that the image pickup devices 211 and 211a are connected to the client devices 200 and 200a, respectively. The image pickup devices 211 and 211a may be said to be types of input devices. Each of the client devices 200 and 200a has an interface for acquiring a biometric image from the image pickup device connected thereto. The acquired biometric image is stored in a storage device, such as RAM or HDD.

Next described are cryptographic processing algorithm examples. A first cryptographic processing algorithm, which is sometimes referred to as "fuzzy commitment", is described first. Subsequently, a second cryptographic processing algorithm obtained by modifying the first cryptographic processing algorithm is described, which is then followed by the explanation of a third cryptographic processing algorithm obtained by further modifying the second cryptographic processing algorithm. In the following descriptions on the cryptographic processing algorithms, it is assumed that data dealt with is mainly binary bit strings.

In the first cryptographic processing algorithm, a template represented by Expression (1) is registered in a database. In Expression (1), c is a ciphertext; g is an encoding function for error-correction encoding; p is confidential information in a plaintext; B is a biometric code acquired at the time of encoding; and h is a hash function. The template includes the ciphertext c and a hash value h(p). The ciphertext c is generated by error-correction encoding the confidential information p using the encoding function g and then adding the biometric code B to the error-correction encoded result. Note that the biometric code B is the encryption key. The hash value h(p) is calculated from the confidential information p using the hash function h. Note that an addition or subtraction operation on a binary bit string is an operation of performing a bitwise exclusive OR.

$$\{c=g(p)+B, h(p)\} \quad (1)$$

In the first cryptographic processing algorithm, the calculation represented by Expression (2) is performed at the time of decoding. In Expression (2), p* is a decoded result; $g^{-1}$ is a decoding function used for error-correction decoding, corresponding to the encoding function g; and B* is a biometric code acquired at the time of decoding. The decoded result p* is generated by subtracting the biometric code B* from the ciphertext c included in the template and then error-correction decoding the subtraction result using the decoding function $g^{-1}$. Note that the biometric code B* is the decryption key.

$$p^* = g^{-1}(c - B^*) = g^{-1}(g(p) + B - B^*) \quad (2)$$
$$= p \text{ iff } B \simeq B^*$$

It is often the case that the biometric code B acquired at the time of encoding and the biometric code B* acquired at the time of decoding do not completely match each other due to various factors such as the difference in the image pickup devices used, variations in the imaging environment, and changes in user posture. Note however that the biometric codes B and B* resemble each other when they are acquired from the same person, but they are dissimilar to each other when acquired from different individuals. That is, the biometric codes B and B* resemble each other only when acquired from the same person.

When the biometric codes B and B* resemble each other, the Hamming distance between the two (the Hamming weight of the difference between the two) is less than or equal to a correctable bit count θ (error correcting capability) of the decoding function $g^{-1}$. The Hamming distance is the count of bit values different in the two bit strings while the Hamming weight is the count of bits that are not 0 (non-zero bits) in one bit string. In the case of a binary bit string, the Hamming weight is the count of bits that are 1. Therefore, in the case where the biometric codes B and B* resemble each other, the difference between the biometric codes B and B* is minor noise for an error-correction code g(p) to correct. As a result, the decoded result p* matches the confidential information p.

On the other hand, in the case where the biometric codes B and B* are dissimilar to each other, the Hamming distance between the two exceeds the correctable bit count θ of the decoding function $g^{-1}$. Therefore, when the biometric codes B and B* are dissimilar to each other, the difference between the biometric codes B and B* is uncorrectable noise for the error-correction code g(p) to correct. As a result, the decoded result p* does not match the confidential information p. That is, only when the biometric codes B and B* are acquired from the same person, the decoded result p* matches the confidential information p.

In the first cryptographic processing algorithm, whether the decoded result p* matches the confidential information p is determined as indicated by Expression (3). That is, a hash value h(p*) is calculated from the decoded result p* using the hash function h, and the hash value h(p*) is compared with the hash value h(p) included in the template. Due to the properties of the hash function h, the hash values h(p) and h(p*) match each other only when the biometric codes B and B* resemble each other, i.e., only when they are acquired from the same person. In view of this, authentication is determined to succeed when the hash values h(p) and h(p*) match each other; however, authentication failure is determined when they do not match each other.

$$h(p^*)=h(p) \text{ iff } B \simeq B^* \quad (3)$$

In the first cryptographic processing algorithm, neither the confidential information p itself nor the biometric code B itself is included in the template. However, because the decryption key is the biometric code B*, there is a possibility that the biometric code B* itself may be transmitted between the client device and the server device. In addition, at the time of successful authentication, because the confidential information p is temporarily extracted, an attacker intruding into the server device or an administrator of the server device may possibly be able to restore the biometric code B from the confidential information p and the ciphertext c included in the template. In view of this problem, a second cryptographic processing algorithm described next is designed to enhance the protection of the biometric codes B and B*.

In the second cryptographic processing algorithm, a template represented by Expression (4) is registered in a database. In Expression (4), f is an encoding function used for error-correction encoding different from that of the encoding function g; and R is a random number selected at the time of encoding. The template includes the ciphertext c and the hash value h(p). The ciphertext c is generated by error-correction encoding the confidential information p using the encoding function g, further error-correction encoding the firstly obtained error-correction encoded result using the encoding function f, and adding an encryption key to the secondly obtained error-correction encoded result. The encryption key is generated by error-correction encoding the random number R using the encoding function f and then adding the biometric code B to the obtained error-correction encoded result.

$$\{c=f(g(p))+f(R)+B, h(p)\} \quad (4)$$

As described above, the second cryptographic processing algorithm doubly performs error-correction encoding. A linear code is used for the error-correction code defined by the encoding function f. A linear or non-linear code is used for the error-correction code defined by the encoding function g. Some examples of linear codes include Hamming codes; Bose-Chaudhuri-Hocquenghem (BCH) codes; Reed-Solomon codes; Turbo codes; low-density parity-check (LDPC) codes; and convolution codes. Some examples of non-linear codes include Nordstrom-Robinson (NR) codes; Nadler codes; and Green codes. In the case of using a linear code as the error-correction code defined by the encoding function g, the error-correction codes individually defined by the encoding functions f and g may be different, or the same, in type.

Note that, because the error-correction code defined by the encoding function f is a linear code, f(g(p))+f(R)+B is equivalent to f(g(p)+R)+B. In generating the ciphertext c, f(g(p)) and f(R) may be calculated first, which is then followed by calculation of f(g(p))+f(R)+B, or g(p)+R may be calculated first, which is then followed by calculation of f(g(p)+R)+B.

In the second cryptographic processing algorithm, the calculation represented by Expression (5) is made at the time of decoding. In Expression (5), $f^{-1}$ is a decoding function for performing error-correction decoding corresponding to the encoding function f; and R* is a random number selected at the time of decoding. The decoded result p* is generated by subtracting a decryption key from the ciphertext c included in the template, error-correction decoding the subtraction result using the decoding function $f^{-1}$, and further error-correction decoding the obtained decoded result using a decoding function $g^{-1}$. The decryption key is generated by error-correction encoding the random number R* using the encoding function f and then adding the biometric code B* to the obtained error-correction encoded result. In the calculation process of Expression (5), f(g(p))+f(R)−f(R*) is transformed into f(g(p)+R−R*) according to the linearity of the encoding function f.

$$p^* = g^{-1}(f^{-1}(c - (f(R^*) + B^*)))$$
$$= g^{-1}(f^{-1}(f(g(p) + R - R^*) + B - B^*))$$  (5)

$$= g^{-1}(g(p) + R - R^*) = p \text{ iff } B \simeq B^*$$

As in the case for the first cryptographic processing algorithm, the difference between the biometric codes B and B* is minor noise for the error-correction code f(g(p)+R−R*) when the biometric codes B and B* resemble each other. As a result, the decoded result of the decoding function $f^{-1}$ matches g(p)+R−R*. Assume that the random numbers R and R* are selected in such a manner that the Hamming distance between the two is less than or equal to the correctable bit count θ of the decoding function $g^{-1}$. In this case, the difference between the random numbers R and R* is minor noise for the error-correction code g(p), and the decoded result p* of the decoding function $g^{-1}$ therefore matches p. Subsequently, in the second cryptographic processing algorithm, whether the decoded result p* matches the confidential information p is determined using the hash function h, as indicated by Expression (3), as in the case for the first cryptographic processing algorithm.

In the second cryptographic processing algorithm, because the decryption key depends on the random number R*, the biometric code B* itself is not transmitted between the client device and the server device. In addition, because the ciphertext c included in the template depends on the random number R, an attacker intruding into the server device or an administrator of the server device is not able to extract the biometric code B from the ciphertext c even if acquiring the decoded confidential information p. Thus, the biometric codes B and B* are provided with enhanced protection.

However, the random numbers R and R* used in the second cryptographic processing algorithm are selected in such a manner that they resemble each other. For this reason, a random number $R_1^*$ selected in decoding a ciphertext resembles not only a random number $R_1$ used in encoding of the ciphertext, but also a random number $R_2$ used in encoding of a different ciphertext. As a result, a plurality of ciphertexts encoded using biometric codes obtained from the same person may all be decoded using one decryption key of the person. Therefore, for example, if an attacker intruding into the server device or an administrator of the server device acquires a decryption key of a user, he/she may fraudulently use the decryption key to successfully decode a ciphertext of the same user on a different server device. In view of this, a third cryptographic processing algorithm described next is designed to enhance the protection of a plurality of ciphertexts pertaining to the same person so that different confidential information sets pertaining to the same person are protected independently of each other.

In the third cryptographic processing algorithm, a template represented by Expression (6) is registered in a database. In Expression (6), M is a mask; and R(M) is a masked random number obtained by performing a masking operation on a random number r selected at the time of encoding using the mask M. The template includes the ciphertext c, the hash value h(p), and the mask M. The ciphertext c is generated by error-correction encoding the confidential information p using the encoding function g, further error-correction encoding the firstly obtained error-correction encoded result using the encoding function f; and adding an encryption key to the secondly obtained error-correction encoded result. The encryption key is generated by error-correction encoding the masked random number R(M) using the encoding function f and then adding the biometric code B to the obtained error-correction encoded result.

$$\{c=f(g(p))+f(R(M))+B, h(p), M\} \quad (6)$$

The mask M is randomly selected at the time of encoding amongst a bit string satisfying a predetermined condition, included in the codomain of the encoding function g (i.e., a bit string space defined by the bit length of the output of the encoding function g). The predetermined condition needed to be met by the mask M is that its Hamming weight is sufficiently greater than the correctable bit count θ of the decoding function $g^{-1}$ but does not exceed 2θ+1. The random number r before the masking operation is a bit string randomly selected from the codomain of the encoding function g. The masked random number R(M) is obtained by performing a masking operation on the selected random number r using the selected mask M. In the case where the bit string is a binary bit string, the masked random number R(M) is generated by performing a bitwise AND between the random number r and the mask M.

In the third cryptographic processing algorithm, both a first decoding path represented by Expression (7) and a second decoding path represented by Expression (8) are implemented at the time of decoding. In Expressions (7) and (8), M* is a mask used for decoding, and it is assumed that M* is identical to the mask M selected at the time of encoding and included in the template. R*(M*) is a masked random number obtained by performing a masking operation on the random number r* selected at the time of decoding using the mask M*. The random number r* before the masking operation is a bit string randomly selected from the codomain of the encoding function g. The masked random number R*(M*) is obtained by performing a masking operation on the selected random number r* using the mask M*. In the case where the bit string is a binary bit string, the masked random number R*(M*) is generated by performing a bitwise AND between the random number r* and the mask M*.

$$\begin{aligned} p_1^* &= g^{-1}(f^{-1}(c - (f(R^*(M^*)) + B^*))) \\ &= g^{-1}(f^{-1}(f(g(p) + R(M) - R^*(M^*)) + B - B^*)) \\ &= g^{-1}(g(p) + R(M) - R^*(M^*)) \text{ iff } B \simeq B^* \end{aligned} \quad (7)$$

$$\begin{aligned} p_2^* &= g^{-1}(f^{-1}(c - (f(R^*(M^*)) + B^*)) + M) \\ &= g^{-1}(f^{-1}(f(g(p) + R(M) - R^*(M^*)) + B - B^*) + M) \\ &= g^{-1}(g(p) + R(M) - R^*(M^*) + M) \text{ iff } B \simeq B^* \end{aligned} \quad (8)$$

A decoded result $p_1^*$ of the first decoding path is generated by subtracting a decryption key from the ciphertext c included in the template, error-correction decoding the subtraction result using the decoding function $f^{-1}$, and further error-correction decoding the obtained decoded result using the decoding function $g^{-1}$. The decryption key is generated by error-correction encoding the masked random number R*(M*) using the encoding function f and then adding the biometric code B* to the error-correction encoded result. According to the linearity of the encoding function f, f(g(p))+f(R(M))−f(R*(M*)) is transformed into f(g(p)+R(M)−R*(M*)). A decoded result $p_2^*$ of the second decoding path is generated by subtracting a decryption key from the ciphertext c, error-correction decoding the subtraction result using the decoding function $f^{-1}$, adding the mask M of the template to the decoded result, and further error-correction decoding the addition result using the decoding function $g^{-1}$. The decryption key is the same as that of the first decoding path.

In the third cryptographic processing algorithm, in the case where the biometric codes B and B* resemble each other and the masks M and M* are identical to each other, either one of the decoded results $p_1^*$ and $p_2^*$ matches the confidential information p, as indicated by Expression (9). In the case where the biometric codes B and B* are dissimilar to each other, on the other hand, the decoding using the decoding function $f^{-1}$ fails in both the first and second decoding paths, and neither the decoded result $p_1^*$ nor $p_2^*$ matches the confidential information p. In addition, in the case where the mask M is different from the mask M*, the decoding using the decoding function $g^{-1}$ fails in both the first and second decoding paths, and neither the decoded result $p_1^*$ nor $p_2^*$ matches the confidential information p.

$$(p_1^*=p) \vee (p_2^*=p) \text{ iff } (B \simeq B^*) \wedge (M=M^*) \quad (9)$$

In the third cryptographic processing algorithm, whether either one of the decoded results $p_1^*$ and $p_2^*$ matches the confidential information p is determined as indicated by Expression (10). That is, the hash value $h(p_1^*)$ is compared with the hash value h(p) included in the template, and the hash value $h(p_2^*)$ is also compared with the hash value h(p). Successful authentication is determined when either one of the hash values $h(p_1^*)$ and $h(p_2^*)$ matches the hash value h(p) while authentication failure is determined when neither of them matches the hash value (p). Therefore, by changing the mask M for each ciphertext, it is possible to prevent misuse of the decryption key.

$$(h(p_1^*)=h(p)) \vee (h(p_2^*)=h(p)) \text{ iff } (B \simeq B^*) \wedge (M=M^*) \quad (10)$$

In the case where the masks M and M* match each other, the masked random numbers R(M) and R*(M*) resemble each other, or they come close to each other when the mask M is added. When M=M*, bits with a value of 1 in R(M)−R*(M) are limited to those with a value of 1 in the mask M. As a result, the Hamming weight of R(M)−R*(M) does not exceed the Hamming weight of the mask M. There are two cases for the Hamming weight of R(M)−R*(M), that is, when the Hamming weight is less than or equal to the correctable bit count θ and when it exceeds the correctable bit count θ.

When the Hamming weight of R(M)−R*(M) is less than or equal to θ, the error-correction decoding using the decoding function $g^{-1}$ is successful in the first decoding path. When the Hamming weight of R(M)−R*(M) exceeds θ, the number of bits whose value is 1 in the mask M but 0 in R(M)−R*(M) is obtained by subtracting the Hamming weight of R(M)−R*(M) from the Hamming weight of the mask M. Therefore, the Hamming weight of R(M)−R*(M)+M is less than a value obtained by subtracting the correctable bit count θ from the Hamming weight of the mask M, which is less than or equal to 2θ+1. That is, the Hamming weight of R(M)−R*(M)+M is less than or equal to the correctable bit count θ. For this reason, the error-correction decoding using the decoding function $g^{-1}$ is successful in the second decoding path.

In the case where the masks M and M* do not match each other, on the other hand, the masked random numbers R(M) and R*(M*) are dissimilar to each other. The expected value of the Hamming weight of the masked random number R(M) is about half of the Hamming weight of the mask M while the expected value of the Hamming weight of the masked random number R*(M*) is about half of the Hamming weight of the mask M*. Therefore, the Hamming weights of the masked random numbers R(M) and R*(M*) are individually sufficiently greater than half of the correctable bit count θ. In addition, since the masks M and M* are selected randomly, there are a small number of bits with a value of 1 in both the masks M and M*. Therefore, the Hamming weight of R(M)−R*(M*) is sufficiently greater than the correctable bit count θ. Since a similar logic is also applied to the Hamming weight of R(M)−R*(M)+M when the masked random number R(M) in the above description is replaced with R(M)+M, the Hamming weight of R(M)−R*(M)+M is sufficiently greater than the correctable bit count θ. As a result, the error-correction decoding using the decoding function $g^{-1}$ fails in the first decoding path, and the error-correction decoding using the decoding function $g^{-1}$ also fails in the second decoding path.

A further supplementary explanation on the nature of the difference between the masked random numbers R(M) and R*(M*) is provided next. Note that because, in a binary bit string space, both addition and subtraction are operations for performing a bitwise exclusive OR and are symmetric with each other, an operator "Δ" is used to represent addition and subtraction. A bit string is equated with a set of bit positions with a value of 1. In addition, the Hamming weight of a bit string is written with an absolute value sign. Note that a relational operator "~" indicates that the left-hand side is distributed as the right-hand side, thereby resulting in a low probability of the difference between the left-hand side and the right-hand side being large.

In the case where the masks M and M* match each other, Expression (11) is true for the masked random numbers R(M) and R*(M) due to the nature of the masking operations. Therefore, Expression (12) is true for the Hamming weight of R(M)ΔR*(M) and the Hamming weight of R(M)ΔR*(M)ΔM. Expression (12) uses a property of sets, |AΔB|=|A|+|B|−2|A∩B|. Based on this, Expression (13) is true if the Hamming weight of the mask M is supposed to be 2θ+1. That is, when the masks M and M* match each other, either the Hamming weight of R(M)ΔR*(M) or the Hamming weight of R(M)ΔR*(M)ΔM is less than or equal to θ.

$$R(M)\Delta R^*(M) \subset M \quad (11)$$

$$|R(M)\Delta R^*(M)| + |(R(M)\Delta R^*(M))\Delta M| = \quad (12)$$
$$2|R(M)\Delta R^*(M)| + |M| - 2|(R(M)\Delta R^*(M)) \cap M| =$$
$$2|R(M)\Delta R^*(M)| + |M| - 2|R(M)\Delta R^*(M)| = |M|$$

$$(|R(M)\Delta R^*(M)| \leq \theta) \vee (|(R(M)\Delta R^*(M))\Delta M| \leq \theta) \quad (13)$$

On the other hand, if the masks M and M* are dissimilar to each other, Expression (14) is true for the masked random number R(M) and R*(M*). When the masks M and M* are dissimilar to each other, the Hamming weight of M∩M* is small and the Hamming weight of R(M)∩R*(M*) is therefore small, which in turn makes Expression (15) true. That is, the Hamming weight of R(M)ΔR*(M*) is close to a value obtained by adding together half of the Hamming weight of the mask M and half of the Hamming weight of the mask M*. Because the Hamming weight of the mask M is sufficiently greater than θ and the Hamming weight of the mask M* is sufficiently greater than θ, the relationship represented by the first term of Expression (16) is true. Since a similar logic is applied when the above R(M) is replaced with M\R(M), the relationship represented by the second term of Expression (16) is true. That is, when the masks M and M* are dissimilar to each other, the Hamming weight of R(M)ΔR*(M) is sufficiently greater than θ and the Hamming weight of R(M)ΔR*(M)ΔM is sufficiently greater than θ.

$$(R(M) \cap R^*(M^*)) \subset (M \cap M^*) \quad (14)$$

$$|R(M)\Delta R^*(M^*)| = |R(M)| + |R^*(M^*)| - 2|R(M) \cap R^*(M^*)|$$
$$\sim |M|/2 + |M^*|/2 \quad (15)$$

$$(\theta << |R(M)\Delta R^*(M^*)|) \wedge (\theta << |(R(M)\Delta R^*(M^*))\Delta M|) \quad (16)$$

According to the above-described technique, in the third cryptographic processing algorithm, decoding is successful in either the first or the second decoding path when the masks M and M* are identical while it fails in both the first and the second decoding paths when the masks M and M* are different from each other. Therefore, it is possible to prevent misuse of the decryption key and protect different confidential information sets pertaining to the same person independently of each other. The server devices 100 and 100a and the client devices 200 and 200a of the second embodiment implement biometric authentication using the third cryptographic processing algorithm. Note that, because the mask M selected at the time of generating the encryption key is also used in generating the decryption key, the mask M is included in the template. The server devices 100 and 100a only need to provide the client devices 200 and 200a with the mask M of the template at the time of authentication. Alternatively, the mask M selected at the time of encoding may be stored in the client devices 200 and 200a.

Note that, for example, a Reed-Solomon code with parameters represented by Expression (17) may be used as the error-correction code defined by the encoding function f. In addition, a Reed-Solomon code with parameters represented by Expression (18), for example, may be used as the error-correction code defined by the encoding function g. In the case where the codomain of the encoding function g and the domain of the encoding function f (i.e., a bit string space defined by the bit length of the input of the encoding function f) are different from each other, they may be associated with each other by defining a correspondence relationship that allows the input of the encoding function f to be uniquely identifiable based on the output of the encoding function g.

$$[2047, 511, 1537]_{2^{11}} \quad (17)$$

$$[511, 191, 321]_{2^9} \quad (18)$$

Figure 5:
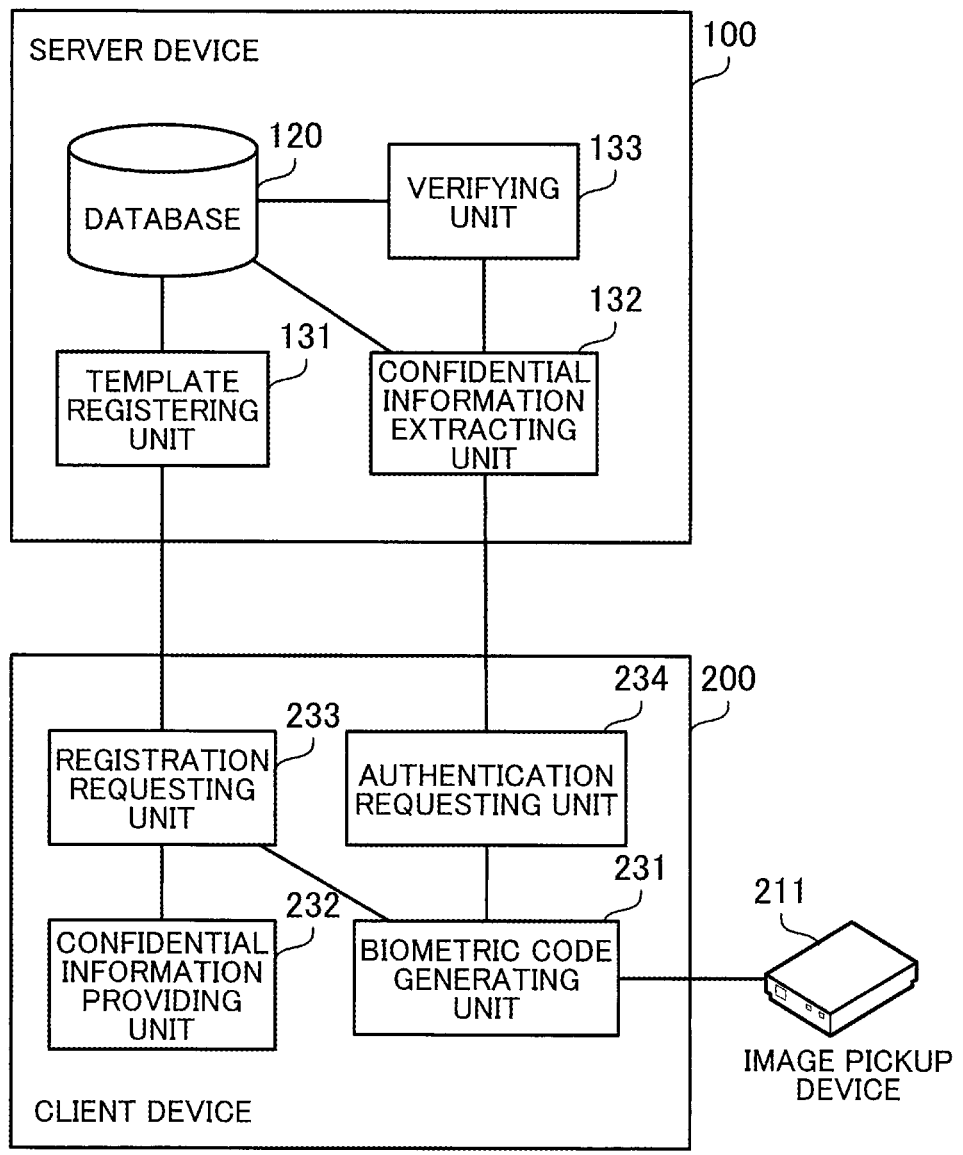
FIG. 5 is a block diagram illustrating an example of functions of the server device and a client device.

Next described are functions of the client devices 200 and 200a and the server devices 100 and 100a. The following gives descriptions of only the client device 200 and the server device 100 as representatives since the client device 200a has the same functions as the client device 200 and the server device 100a has the same functions as the server device 100. FIG. 5 is a block diagram illustrating an example of functions of the server device and the client device. The client device 200 includes a biometric code generating unit 231, a confidential information providing unit 232, a registration requesting unit 233, and an authentication requesting unit 234. The biometric code generating unit 231, the confidential information providing unit 232, the registration requesting unit 233, and the authentication requesting unit 234 are implemented, for example, as modules of a program executed by a CPU.

When the user of the client device 200 instructs registration or authentication, the biometric code generating unit 231 instructs the image pickup device 211 to take a biometric image and acquires the biometric image from the image pickup device 211. For example, the biometric code generating unit 231 acquires an image of a fingertip, an image of a palm, an image of an eye, or an image of a signature written by the user. The biometric code generating unit 231 generates, from the acquired biometric image, a biometric code by a method suitable for the part from which the image was taken.

For example, the biometric code generating unit 231 generates a biometric code representing characteristics of a fingerprint from an image of a fingertip. The biometric code generating unit 231 generates, for example, a biometric code representing characteristics of veins from an image of a palm of a hand. The biometric code generating unit 231 generates, for example, a biometric code representing characteristics of an iris from an image of an eye. The biometric code generating unit 231 generates, for example, a biometric code representing characteristics of handwriting from an image of a signature. The biometric codes are, for example, binary bit strings of a predetermined length.

When the user of the client device 200 instructs registration, the confidential information providing unit 232 provides confidential information of the user. The confidential information may be stored in RAM or a HDD of the client device 200 in advance, or may be input by the user via an input device. Such confidential information is information created by the individual user or information given to an individual user and not supposed to be disclosed. The following are examples of confidential information to be used: user identifiers; passwords; personal identification numbers; secret keys for cryptographic processing; and identification codes such as bankcard numbers and credit card numbers.

When the user of the client device 200 instructs registration, the registration requesting unit 233 acquires a biometric code from the biometric code generating unit 231 and confidential information from the confidential information providing unit 232. The registration requesting unit 233 generates a template using the biometric code and the confidential information and transmits, to the server device 100, a registration request including the template. In the case where the server device 100 handles authentication of a plurality of users, the registration request may include identification information for identifying a user concerned (the user of the client device 200 in this case). The identification information may be information input by the user, such as a user identifier, or information read from a storage medium, such as a card number.

When the user of the client device 200 instructs authentication, the authentication requesting unit 234 transmits an authentication request to the server device 100. In the case where the server device 100 handles authentication of a plurality of users, the authentication request may include identification information for identifying a user concerned (the user of the client device 200 in this case). As a response to the authentication request, the authentication requesting unit 234 receives a decryption key request including a mask. Then, the authentication requesting unit 234 acquires a biometric code from the biometric code generating unit 231. The authentication requesting unit 234 generates a decryption key using the mask designated by the server device 100 and the biometric code and transmits the decryption key to the server device 100. Subsequently, the authentication requesting unit 234 receives, from the server device 100, an authentication result indicating authentication success or failure.

The server device 100 includes a database 120, a template registering unit 131, a confidential information extracting unit 132, and a verifying unit 133. The database 120 is implemented using a storage area secured, for example, in the RAM 102 or the HDD 103. The template registering unit 131, the confidential information extracting unit 132, and the verifying unit 133 are implemented, for example, as modules of a program executed by the CPU 101.

The database 120 stores therein templates generated by the client devices 200 and 200*a*. Each template corresponding to an individual user includes three items. A template first item is a ciphertext created by encoding confidential information using a biometric code. A template second item is a hash value of the confidential information. A template third item is a mask selected by the client device 200 or 200*a* at the time of encoding. The template first, second, and third items are, for example, binary bit strings. In the case where the server device 100 handles authentication of a plurality of users, identification information is associated with each template.

The template registering unit 131 receives a registration request from the client device 200 or 200*a*. Then, the template registering unit 131 registers, in the database 120, the template included in the registration request. In the case where the registration request includes identification information, the template registering unit 131 registers, in the database 120, the template and the identification information in association with each other.

The confidential information extracting unit 132 receives an authentication request from the client device 200 or 200*a*. Then, the confidential information extracting unit 132 reads the mask in the template third item from the template stored in the database 120, and sends back a decryption key request including the read mask. When the authentication request includes identification information, the confidential information extracting unit 132 reads a mask from a template associated with the identification information. Subsequently, the confidential information extracting unit 132 receives a decryption key as a response to the decryption key request. In response, the confidential information extracting unit 132 reads a ciphertext in the template first item from the database 120. The confidential information extracting unit 132 decodes the ciphertext using the received decryption key and tries to extract confidential information.

In this regard, the confidential information extracting unit 132 implements the first and second decoding paths to thereby generate two decoded results. If the biometric code and the mask value used to generate the decryption key are valid, confidential information is duly extracted through either one of the first and second decoding paths. On the other hand, if at least one of the biometric code and the mask value used to generate the decryption key is not valid, confidential information is not properly extracted through either one of the first and second decoding paths.

The verifying unit 133 acquires, from the confidential information extracting unit 132, the decoded results of the individual first and second decoding paths. The verification unit 133 calculates a hash value for each of the acquired two decoded results. The verification unit 133 also acquires a hash value in the template second item from the database 120. The verifying unit 133 compares the template hash value against each of the hash value for the decoded result of the first decoding path and the hash value for the decoded result of the second decoding path. If the template hash value matches either one of the hash values for the two decoded results, the verifying unit 133 determines that the authentication target user is a registered user and therefore that authentication succeeds. On the other hand, if the template hash value matches neither one of the hash values for the two decoded results, the verifying unit 133 determines that the authentication target user is not a registered user and therefore that authentication fails. The verifying unit 133 sends back an authentication result indicating authentication success or failure to a client device having transmitted the authentication request.

FIG. 6 illustrates an example of a first template table. A template table 121 is stored in the database 120. The template table 121 includes identification information, the ciphertext c, the hash value h(p), and the mask M for each authentication unit (for example, for each user). The identification information is information for identifying an authentication unit, and may be a user identifier or a card number. The ciphertext c is the template first item of the template represented by Expression (6). The hash value h(p) is the template second item of the template represented by Expression (6). The mask M is the template third item of the template represented by Expression (6). The template table 121 may register therein templates of a plurality of authentication units.

Figure 7:
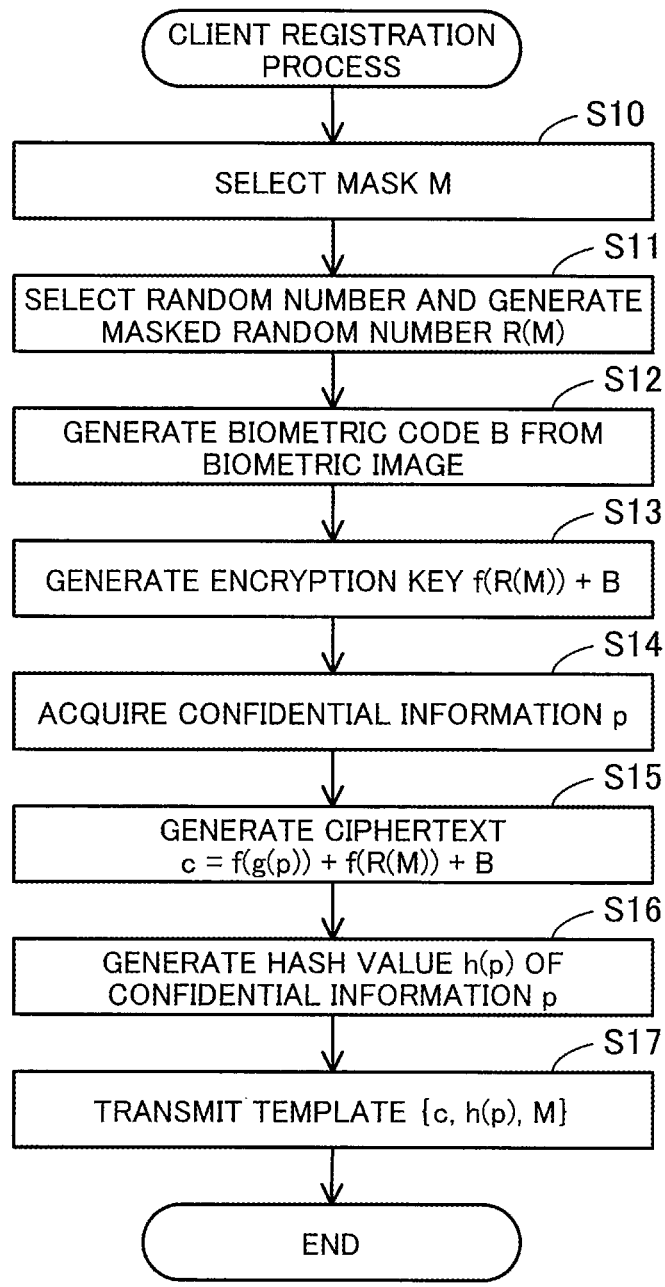
FIG. 7 is a flowchart illustrating a procedure example of a first client registration process.

Next described are processing procedures carried out by the client device 200 and the server device 100. FIG. 7 is a flowchart illustrating a procedure example of a first client registration process.

(Step S10) The registration requesting unit 233 randomly selects one mask M amongst a set of masks satisfying a predetermined condition. The Hamming weight of the mask M is sufficiently greater than θ but does not exceed 2θ+1.

(Step S11) The registration requesting unit 233 randomly selects the random number r, and generates the masked random number R(M) by performing a masking operation on the selected random number r using the mask M of step S10. The masking operation is, for example, an operation of performing a bitwise AND of the random number r and the mask M.

(Step S12) The biometric code generating unit 231 acquires a biometric image from the image pickup device 211. The biometric code generating unit 231 generates the biometric code B by analyzing a physical characteristic such as a fingerprint, veins, or an iris, or a behavioral characteristic such as handwriting, on the biometric image.

(Step S13) The registration requesting unit 233 error-correction encodes the masked random number R(M) of step S11 using the encoding function f. The registration requesting unit 233 generates an encryption key by adding the biometric code B of step S12 to the error-correction encoded result. The addition is, for example, an operation of performing a bitwise exclusive OR of the error-correction encoded result and the biometric code B.

(Step S14) The confidential information providing unit 232 acquires the confidential information p pertaining to the user. The confidential information providing unit 232 may read the confidential information p from RAM or a HDD, or may prompt the user to input the confidential information p into an input device and acquire the confidential information p from the input device.

(Step S15) The registration requesting unit 233 error-correction encodes the confidential information p of step S14 using the encoding function g, and further error-correction encodes the firstly obtained error-correction encoded result using the encoding function f. The registration requesting unit 233 adds the encryption key of step S13 to the secondly obtained error-correction encoded result to thereby generate the ciphertext c.

(Step S16) The registration requesting unit 233 generates the hash value h(p) of the confidential information p.

(Step S17) The registration requesting unit 233 generates a template including the ciphertext c of step S15, the hash value h(p) of step S16, and the mask M of step S10. The registration requesting unit 233 transmits a registration request including the template to the server device 100. The registration request is received by the template registering unit 131 of the server device 100, and the template is then registered in the database 120. Note that the registration request may include identification information, and the template may be registered in the database 120 in association with the identification information.

Figure 8:
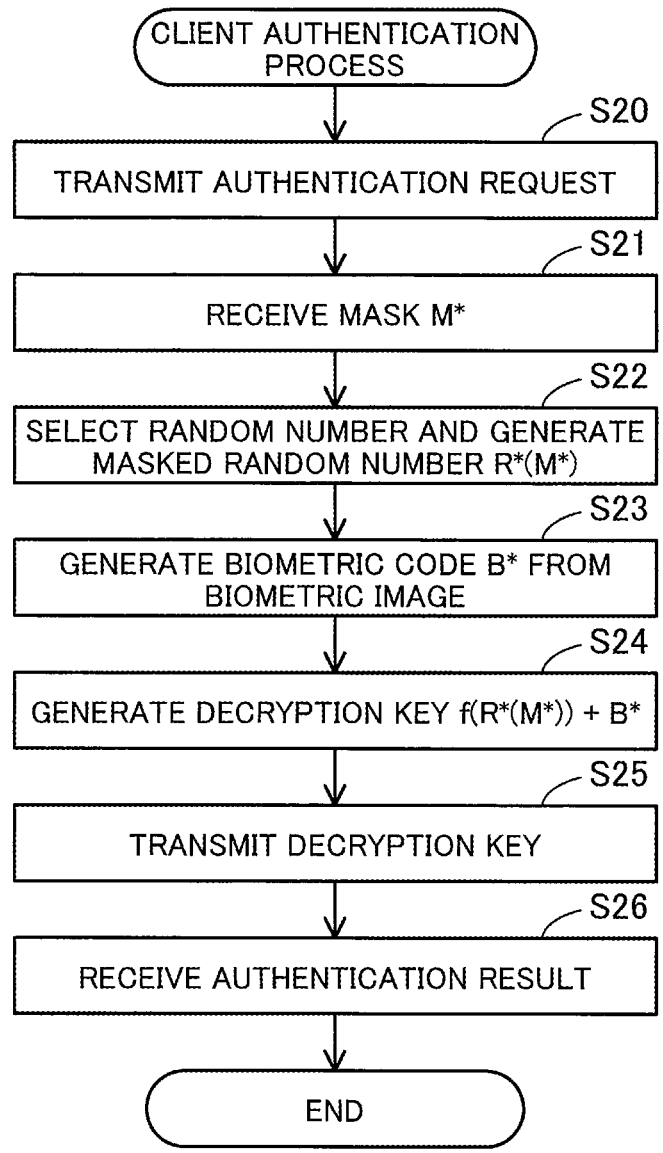
FIG. 8 is a flowchart illustrating a procedure example of a first client authentication process.

FIG. 8 is a flowchart illustrating a procedure example of a first client authentication process.

(Step S20) The authentication requesting unit 234 transmits an authentication request to the server device 100. The authentication request may include identification information indicating an authentication target user.

(Step S21) The authentication requesting unit 234 receives a decryption key request including the mask M*.

(Step S22) The authentication requesting unit 234 randomly selects the random number r* and generates the masked random number R*(M*) by performing a masking operation on the selected random number r* using the mask M* of step S21. The masking operation is, for example, an operation of performing a bitwise AND of the random number r* and the mask M*.

(Step S23) The biometric code generating unit 231 acquires a biometric image from the image pickup device 211. The biometric code generating unit 231 analyzes a physical characteristic such as a fingerprint, veins, or an iris, or a behavioral characteristic such as handwriting, on the biometric image, and then generates the biometric code B*.

(Step S24) The authentication requesting unit 234 error-correction encodes the masked random number R*(M*) of step S22 using the encoding function f. The authentication requesting unit 234 generates a decryption key by adding the biometric code B* of step S23 to the error-correction encoded result. The addition is, for example, an operation of performing a bitwise exclusive OR of the error-correction encoded result and the biometric code B*.

(Step S25) The authentication requesting unit 234 transmits the decryption key to the server device 100. The authentication requesting unit 234 may transmit identification information indicating the authentication target user together with the decryption key.

(Step S26) The authentication requesting unit 234 receives an authentication result from the server device 100. The authentication result indicates either authentication success or failure. The authentication requesting unit 234 may present the authentication result on a display. In the case where authentication fails, the authentication requesting unit 234 may go through the authentication procedure once again by reacquiring a biometric image and generating a decryption key again.

Figure 9:
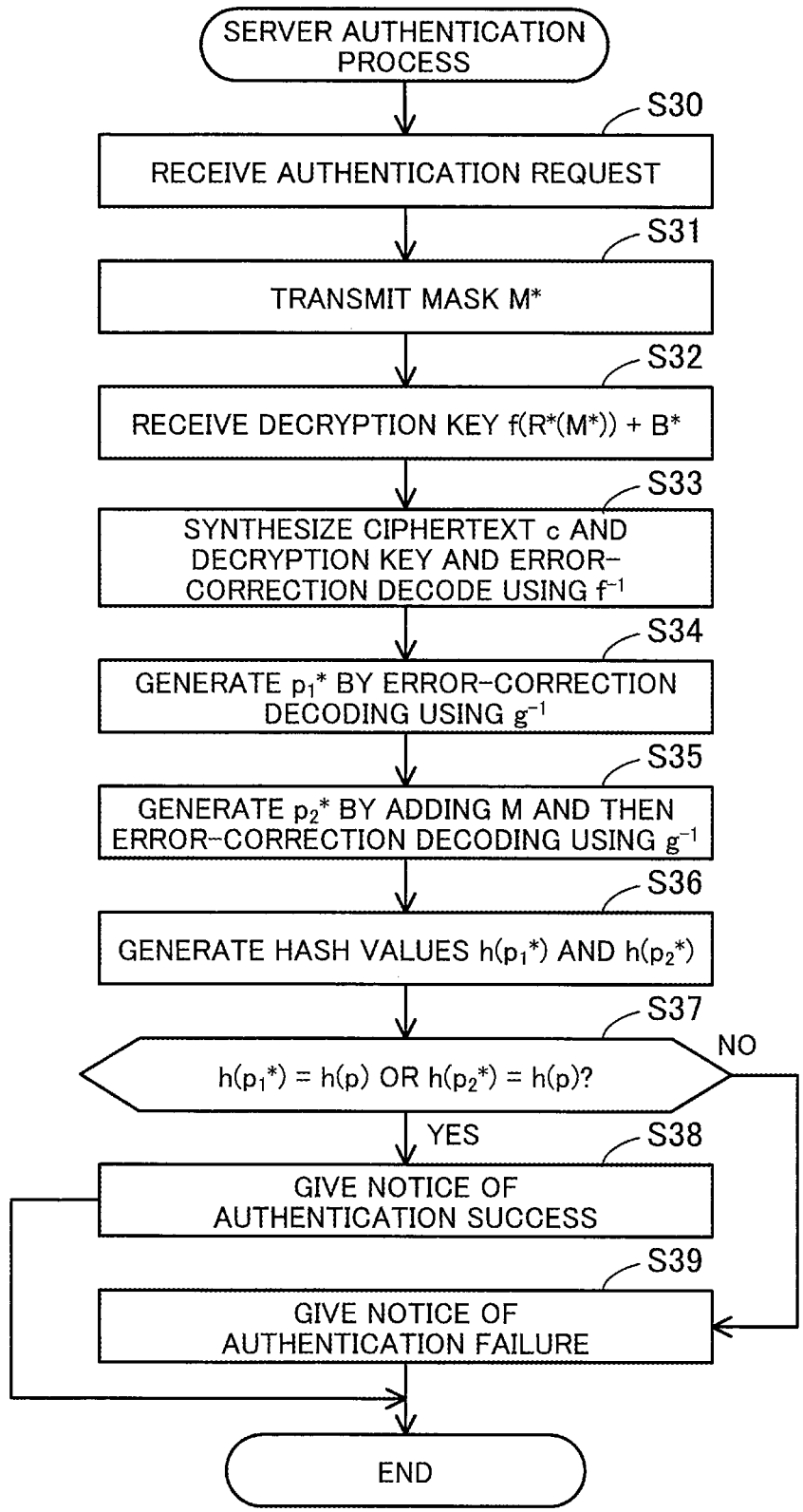
FIG. 9 is a flowchart illustrating a procedure example of a first server authentication process.

FIG. 9 is a flowchart illustrating a procedure example of a first server authentication process.

(Step S30) The confidential information extracting unit 132 receives an authentication request from the client device 200. The authentication request may include identification information indicating an authentication target user.

(Step S31) The confidential information extracting unit 132 extracts, from the database 120, the mask M* included in the template of the authentication target user. If the authentication request includes identification information, the confidential information extracting unit 132 may extract the mask M* from the template associated with the identification information. The confidential information extracting unit 132 transmits the extracted mask M* to the client device 200.

(Step S32) The confidential information extracting unit 132 receives a decryption key from the client device 200. The confidential information extracting unit 132 may also receive identification information indicating the authentication target user together with the decryption key.

(Step S33) The confidential information extracting unit 132 extracts, from the database 120, the ciphertext c included in the template of the authentication target user. In the case of receiving the identification information in step S30 or S32, the confidential information extracting unit 132 may extract the mask M* from the template associated with the identification information. The confidential information extracting unit 132 synthesizes the ciphertext c and the decryption key of step S32. For example, the confidential information extracting unit 132 subtracts the decryption key from the ciphertext c. The subtraction is, for example, an operation of performing a bitwise exclusive OR of the ciphertext c and the decryption key. The confidential information extracting unit 132 error-correction decodes the synthesized bit string using the decoding function $f^{-1}$.

(Step S34) The confidential information extracting unit 132 implements the first decoding path using the decoded result of step S33. That is, the confidential information extracting unit 132 further error-correction decodes the decoded result of step S33 using the decoding function $g^{-1}$ to thereby generate the decoded result $p_1^*$.

(Step S35) The confidential information extracting unit 132 implements the second decoding path using the decoded result of step S33. That is, the confidential information extracting unit 132 extracts, form the database 120, the mask M included in the template of the authentication target user, and adds the mask M to the decoded result of step S33. The addition is, for example, an operation of performing a bitwise exclusive OR of the decoded result and the mask M. The confidential information extracting unit 132 further error-correction decodes a bit string obtained by the addition of the mask M using the decoding function $g^{-1}$ to thereby generate the decoded result $p_2^*$.

(Step S36) The verifying unit 133 generates the hash value $h(p_1^*)$ for the decoded result $p_1^*$ of the step S34 and the hash value $h(p_2^*)$ for the decoded result $p_2^*$ of the step S35.

(Step S37) The verifying unit 133 extracts, from the database 120, the hash value h(p) included in the template of the authentication target user. The verifying unit 133 determines whether the hash value $h(p_1^*)$ matches the hash value h(p) or the hash value $h(p_2^*)$ matches the hash value h(p). The process moves to step S38 if this condition is satisfied, and the process moves to step S39 if this condition is not satisfied.

(Step S38) The verifying unit 133 determines that the authentication succeeds. The verifying unit 133 transmits an authentication result indicating authentication success to the client device 200.

(Step S39) The verifying unit 133 determines that the authentication fails. The verifying unit 133 transmits an authentication result indicating authentication failure to the client device 200.

Figure 10:
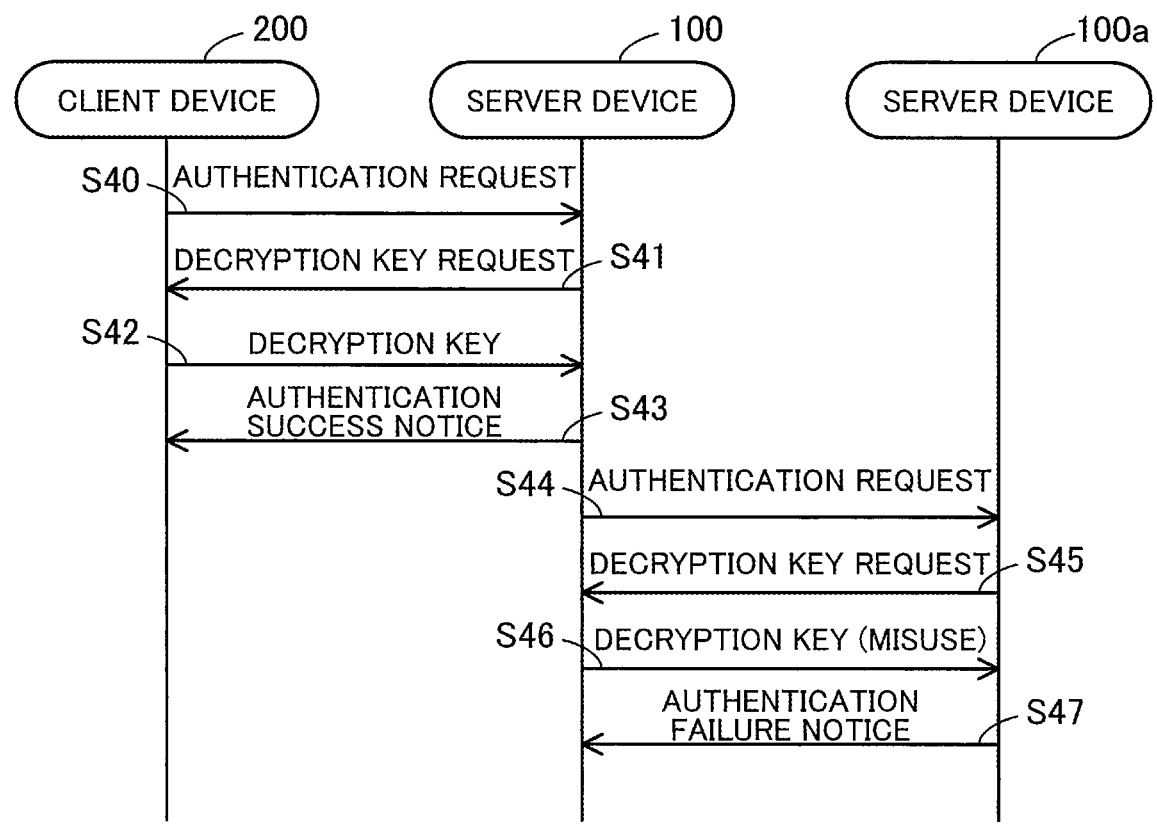
FIG. 10 is a sequence diagram illustrating an example of misuse of a decryption key by the server device.

Next described is an example of a sequence in which an attempt to misuse a decryption key is made. FIG. 10 is a sequence diagram illustrating an example of misuse of a decryption key by a server device. In this sequence example, the client device 200 transmits an authentication request to the server device 100 (step S40). The server device 100 transmits a decryption key request including the mask M* to the client device 200 (step S41). The client device 200 generates a decryption key using the designated mask M* and then transmits the decryption key to the server device 100 (step S42). The server device 100 determines that the authentication succeeds and then transmits an authentication success notice to the client device 200 (step S43).

Assume here that an attacker intruding into the server device 100 or malicious administrator of the server device 100 has fraudulently acquired the decryption key of step S42. Further assume that the attacker or the malicious administrator has transmitted an authentication request to the server device 100a using the server device 100 or a different device. Let us assume that the server device 100 is used for the attack (step S44). In response, the server device 100a transmits a decryption key request to the server device 100 (step S45). The server device 100 fraudulently uses the decryption key of step S42 and transmits it to the server device 100a. In this case, if a mask has not been used for encoding or decoding, a decoding attempt using the misused decryption key may possibly achieve success, resulting in authentication success. However, when different masks are used for ciphertexts pertaining to the same person registered with the server devices 100 and 100a, the decoding attempt with the misused decryption key fails, and the authentication therefore fails. As a result, the server device 100a transmits an authentication failure notice to the server device 100 (step S47).

Note that, because it is not possible to extract the biometric code B* from the decryption key of step S42, the attacker or malicious administrator is not able to generate the valid decryption key which is created by combining the mask designated in step S45 and the biometric code B* generated by the client device.

According to the cryptographic data processing system of the second embodiment, a biometric code itself is not transmitted between the server device 100 or 100a and the client device 200 or 200a. In addition, the biometric code is not extractable from the template even using confidential information temporarily restored in the server device 100 or 100a. Therefore, it is possible to reduce the risk of the biometric code being leaked. Further, even if a plurality of ciphertexts are generated using the biometric information of the same person, changing masks used prevents a decryption key corresponding to a ciphertext from being misused for different ciphertexts. Thus, it is possible to enhance the protection of different confidential information pertaining to the same person. In addition, it is designed to achieve successful decoding only when both the biometric code and the mask are valid and result in decoding failure if either the biometric code or the mask is not valid. Thus, it is possible to improve the security against attacks and the operational stability.

(c) Third Embodiment

A cryptographic data processing system according to a third embodiment is configured by applying the cryptographic processing algorithm of the second embodiment to challenge-response authentication. The cryptographic data processing system of the third embodiment may be implemented by using the hardware configuration of FIG. 4 and the software configuration of FIG. 5. For this reason, the third embodiment below is described, sometimes using reference numerals appearing in FIGS. 4 and 5 of the second embodiment.

In the case of performing challenge-response authentication between the client device 200 and the server device 100, the client device 200 transmits an authentication request to the server device 100. The server device 100 transmits a random challenge message (sometimes referred to simply as "challenge") to the client device 200. The client device 200 generates a response that only the valid authentication target is able to create based on the challenge, and transmits it to the server device 100. The server device 100 determines whether the authentication succeeds or fails based on the transmitted challenge and the received response, and transmits the authentication result to the client device 200.

In the case of applying the cryptographic processing algorithm of the second embodiment, the template represented by Expression (19) is registered in the server device 100. In Expression (19), k is a decryption key; m is a small mask; and R(m) is a masked random number corresponding to the small mask m. The template includes the decryption key k and the small mask m. The decryption key k is generated by error-correction encoding the masked random number R(m) using the encoding function f and adding the biometric code B to the obtained error-correction encoded result.

$$\{k=f(R(m))+B, m\} \quad (19)$$

The small mask m is randomly selected at the time of generating the decryption key k amongst a bit string satisfying a predetermined condition, included in the codomain of the encoding function g. The predetermined condition needed to be met by the small mask m is that its Hamming weight is sufficiently greater than the correctable bit count $\theta$ of the decoding function $g^{-1}$ but sufficiently less than $2\theta$. Assume, for example, that the Hamming weight of the small mask m is about $1.5\theta$. The masked random number R(m) is randomly selected at the time of generating the decryption key k amongst a bit string satisfying predetermined conditions, included in the codomain of the encoding function g. The masked random number R(m) depends on the small mask m. The predetermined conditions needed to be met by the masked random number R(m) are that bits with a value of 0 in the small mask m also have a value of 0 in the masked random number R(m), and that the Hamming weight of the masked random number R(m) is exactly, or nearly, half of the Hamming weight of the small mask m.

After the template is registered with the server device 100, user authentication is implemented in the following manner. The server device 100 selects a large mask M and a plaintext set P in response to an authentication request from the client device 200. The large mask M depends on the small mask m. The large mask M is randomly selected at the time of authentication amongst a bit string satisfying predetermined conditions, included in the codomain of the encoding function g. The predetermined conditions needed to be met by the large mask M are that bits with a value of 1 in the small mask m also have a value of 1 in the large mask M, and that the Hamming weight of the large mask M does not exceed $2\theta+1$. The Hamming weight of the large mask M is preferably close to $2\theta+1$.

The plaintext set P is a subset of the domain of the encoding function g, and is selected at the time of authentication from the domain of the encoding function g in such a manner that the plaintext set P satisfies predetermined conditions. The conditions needed to be met by the plaintext set P are that the plaintext set P includes a sufficiently large number of elements (the number of elements is sufficiently larger than 1), and that the number of elements of the plaintext set P is sufficiently smaller than the entire domain of the encoding function g. Assuming, for example, that the error-correction code of the encoding function g is a Reed-Solomon code defined by the parameters of Expression (18), the domain of the encoding function g is a 1719-bit string space. In this case, the values of the first 256 bits are randomly determined, which allows the plaintext set P including $2^{1463}$ elements set by the remaining 1463 bits to be defined.

The server device 100 transmits, to the client device 200, a challenge including the selected large mask M and the plaintext set P. The client device 200 randomly selects the confidential information p from the plaintext set P. In addition, the client device 200 generates a masked random number R*(M) depending on the large mask M. The masked random number R*(M) is randomly selected at the time of authentication amongst a bit string satisfying a predetermined condition, included in the codomain of the encoding function g. The predetermined condition needed to be met by the masked random number R*(M) is that bits with a value of 0 in the large mask M also have a value of 0 in the masked random number R*(M).

The client device 200 generates the ciphertext c represented by Expression (20) using the above-mentioned confidential information p and masked random number R*(M). The ciphertext c is generated by error-correction encoding the confidential information p using the encoding function g, further error-correction encoding the firstly obtained error-correction encoded result using the encoding function f, and adding the encryption key k* to the secondly obtained error-correction encoded result. The encryption key k* is generated by error-correction encoding the masked random number R*(M) using the encoding function f and adding the biometric code B* acquired at the time of authentication to the obtained error-correction encoded result. The client device 200 transmits a response including the ciphertext c to the server device 100.

$$c=f(g(p))+f(R^*(M))+B^* \quad (20)$$

The server device 100 decodes the ciphertext c using the decryption key k. The decoding procedure is the same as that in the second embodiment. That is, at the time of decoding, the server device 100 implements both a first decoding path represented by Expression (21) and a second decoding path represented by Expression (22).

$$\begin{aligned} p_1^* &= g^{-1}(f^{-1}(c-k)) \\ &= g^{-1}(f^{-1}(f(g(p)+R^*(M)-R(m))+B^*-B)) \\ &= g^{-1}(g(p)+R^*(M)-R(m)) \text{ iff } B \simeq B^* \end{aligned} \quad (21)$$

$$\begin{aligned} p_2^* &= g^{-1}(f^{-1}(c-k)+M) \\ &= g^{-1}(f^{-1}(f(g(p)+R^*(M)-R(m))+B^*-B)+M) \\ &= g^{-1}(g(p)+R^*(M)-R(m)+M) \text{ iff } B \simeq B^* \end{aligned} \quad (22)$$

The decoded result $p_1^*$ of the first decoding path is generated by subtracting the decryption key k included in the template from the ciphertext c included in the response, error-correction decoding the subtraction result using the decoding function $f^{-1}$, and further error-correction decoding the decoded result using the decoding function $g^{-1}$. The decoded result $p_2^*$ of the second decoding path is generated by subtracting the decryption key k included in the template from the ciphertext c included in the challenge, error-correction decoding the subtraction result using the decoding function $f^{-1}$, adding the large mask M to the decoded result, and further error-correction decoding the addition result using the decoding function $g^{-1}$.

The server device 100 determines whether either one of the decoded results $p_1^*$ and $p_2^*$ is included in the plaintext set P (i.e., whether either of them is an element belonging to the plaintext set P). The authentication is determined to succeed when either one of the decoded results $p_1^*$ and $p_2^*$ is included in the plaintext set P. On the other hand, the authentication is determined to fail when neither the decoded result $p_1^*$ nor $p_2^*$ is included in the plaintext set P.

Note here that, because bits with a value of 1 in the masked random number R(m) are limited to those with a value of 1 in the small mask m, they are limited to bits with a value of 1 in the large mask M. In addition, bits with a value of 1 in the masked random number $R^*(M)$ are limited to those with a value of 1 in the large mask M. Therefore, in the case where the Hamming weight of $R^*(M)-R(m)$ does not exceed the correctable bit count θ, the error-correction decoding using the decoding function $g^{-1}$ in the first decoding path succeeds, and the decoded results $p_1^*$ therefore matches the confidential information p. In this case, the decoded result $p_1^*$ is an element of the plaintext set P. In addition, even if the Hamming weight of $R^*(M)-R(m)$ exceeds the correctable bit count θ, the error-correction decoding using the decoding function $g^{-1}$ in the second decoding path succeeds, and the decoded result $p_2^*$ matches the confidential information p. In this case, the decoded result $p_2^*$ is an element of the plaintext set P.

Next described is the possibility of misuse of the decryption key k. Assume that the decryption key k registered with the server device 100 has been fraudulently acquired by an attacker intruding into the server device 100 or administrator of the server device 100. Then, there is a possibility that a ciphertext $f(g(p))+f(R(m))+B^*$ may be fraudulently generated using the decryption key k, and a response including an unauthorized ciphertext may be transmitted to the server device 100a with which the decryption key $f(R(m^*))+B$ is registered.

However, the server device 100a calculates $g(p)+R(m)-R(m^*)$ in the decoding process. The Hamming weight of each of the masked random numbers R(m) and $R(m^*)$ is sufficiently larger than half of the correctable bit count θ. In addition, bits with a value of 1 both in the small masks m and $m^*$ are small in number. As a result, the Hamming weight of $R(m)-R(m^*)$ is sufficiently greater than the correctable bit count θ, and the error-correction decoding using the decoding function $g^{-1}$ therefore fails.

FIG. 11 illustrates an example of a second template table. A template table 122 is stored in the database 120 of the server device 100. The template table 122 includes identification information, the decryption key k, and the small mask m for each authentication unit (for example, for each user). The identification information is information for identifying an authentication unit, and may be a user identifier or card number. The decryption key k is the template first item of the template represented by Expression (19). The small mask m is the template second item of the template represented by Expression (19). The template table 122 may register therein templates of a plurality of authentication units.

Figure 12:
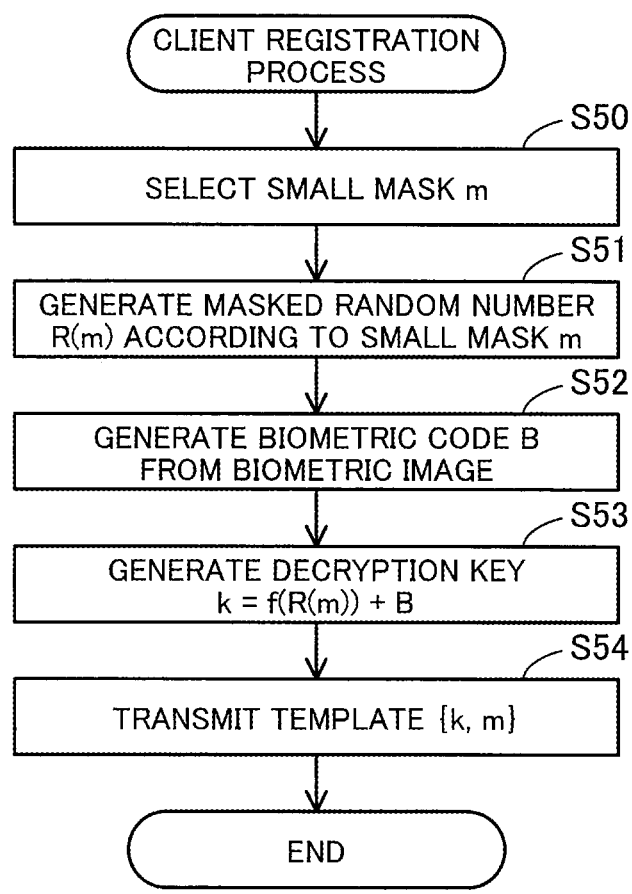
FIG. 12 is a flowchart illustrating a procedure example of a second client registration process.

Next described are processing procedures carried out by the server device 100 and the client device 200. FIG. 12 is a flowchart illustrating a procedure example of a second client registration process.

(Step S50) The registration requesting unit 233 randomly selects the small mask m from a mask set satisfying a predetermined condition. The Hamming weight of the small mask m is sufficiently greater than θ but sufficiently less than 2θ.

(Step S51) The registration requesting unit 233 generates the masked random number R(m) depending on the small mask m of step S50. Bits with a value of 0 in the small mask m also have a value of 0 in the masked random number R(m). In addition, the Hamming weight of the masked random number R(m) is exactly, or nearly, half of the Hamming weight of the small mask m. The generated masked random number R(m) is randomly selected from a range satisfying the foregoing conditions.

(Step S52) The biometric code generating unit 231 acquires a biometric image from the image pickup device 211. The biometric code generating unit 231 generates the biometric code B by analyzing a physical characteristic such as a fingerprint, veins, and an iris, or a behavioral characteristic such as handwriting, on the biometric image.

(Step S53) The registration requesting unit 233 error-correction encodes the masked random number R(m) of step S51 using the encoding function f. The registration requesting unit 233 generates the decryption key k by adding the biometric code B of step S52 to the obtained error-correction encoded result. The addition is, for example, an operation of performing a bitwise exclusive OR of the error-correction encoded result and the biometric code B.

(Step S54) The registration requesting unit 233 generates a template including the decryption key k of step S53 and the small mask m of step S50. The registration requesting unit 233 transmits a registration request including the template to the server device 100. The registration request is received by the template registering unit 131 of the server device 100, and the template is then registered in the database 120.

Figure 13:
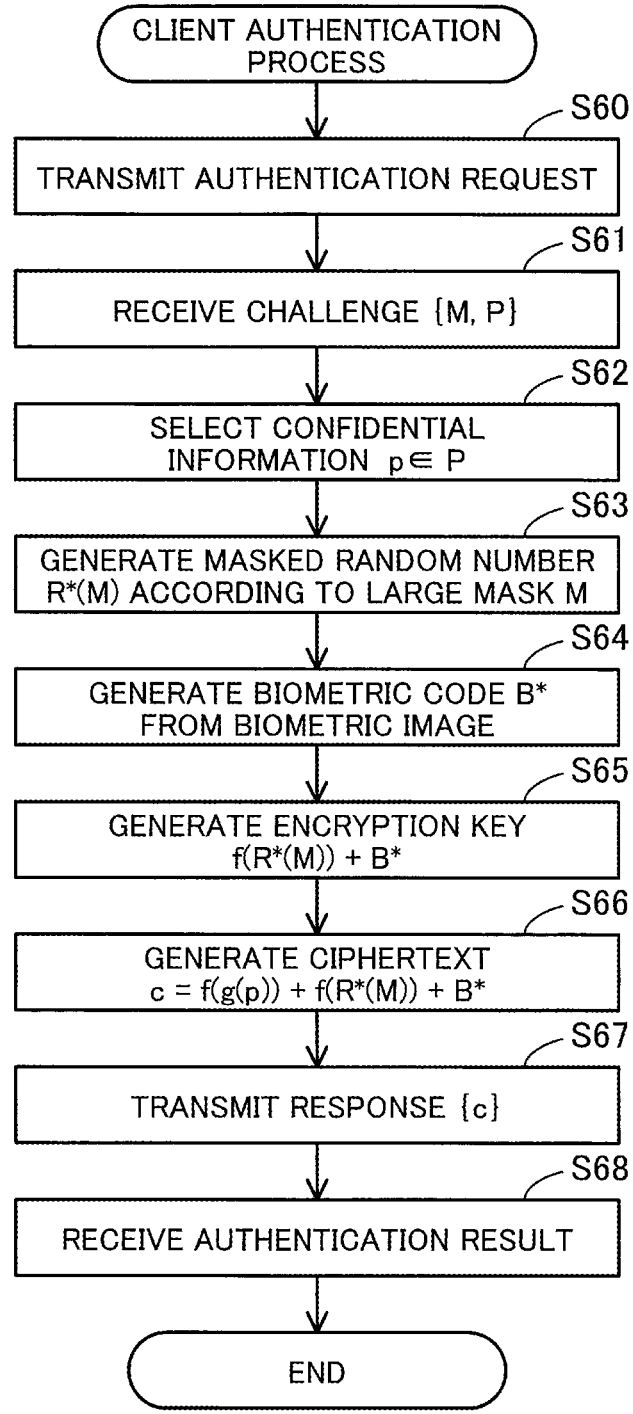
FIG. 13 is a flowchart illustrating a procedure example of a second client authentication process.

FIG. 13 is a flowchart illustrating a procedure example of a second client authentication process.

(Step S60) The authentication requesting unit 234 transmits an authentication request to the server device 100.

(Step S61) The authentication requesting unit 234 receives, from the server device 100, a challenge including the large mask M and information defining the plaintext set P. The information defining the plaintext set P is, for example, information designating the first 256 bits out of 1719 bits.

(Step S62) The authentication requesting unit 234 randomly selects the confidential information p from the plaintext set P.

(Step S63) The authentication requesting unit 234 generates the masked random number $R^*(M)$ depending on the large mask M included in the challenge. Bits with a value of 0 in the large mask M also have a value of 0 in the masked random number $R^*(M)$. The generated masked random number $R^*(M)$ is randomly selected from a range satisfying the foregoing condition.

(Step S64) The biometric code generating unit 231 acquires a biometric image from the image pickup device 211. The biometric code generating unit 231 analyzes a physical characteristic such as a fingerprint, veins, or an iris, or a behavioral characteristic such as handwriting, on the biometric image, and then generates the biometric code $B^*$.

(Step S65) The authentication requesting unit 234 error-correction encodes the masked random number $R^*(M)$ of step S63 using the encoding function f. The authentication requesting unit 234 generates an encryption key by adding the biometric code $B^*$ of step S64 to the error-correction encoded result. The addition is, for example, an operation of performing a bitwise exclusive OR of the error-correction encoded result and the biometric code $B^*$.

(Step S66) The authentication requesting unit 234 error-correction encodes the confidential information p of step S62 using the encoding function g, and then further error-correction encodes the firstly obtained error-correction encoded result using the encoding function f. The authentication requesting unit 234 adds the encryption key of step S65 to the secondly obtained error-correction encoded result to thereby generate the ciphertext c.

(Step S67) The authentication requesting unit 234 transmits, to the server device 100, a response including the ciphertext c of step S66 as a reply to the challenge.

(Step S68) The authentication requesting unit 234 receives an authentication result from the server device 100.

Figure 14:
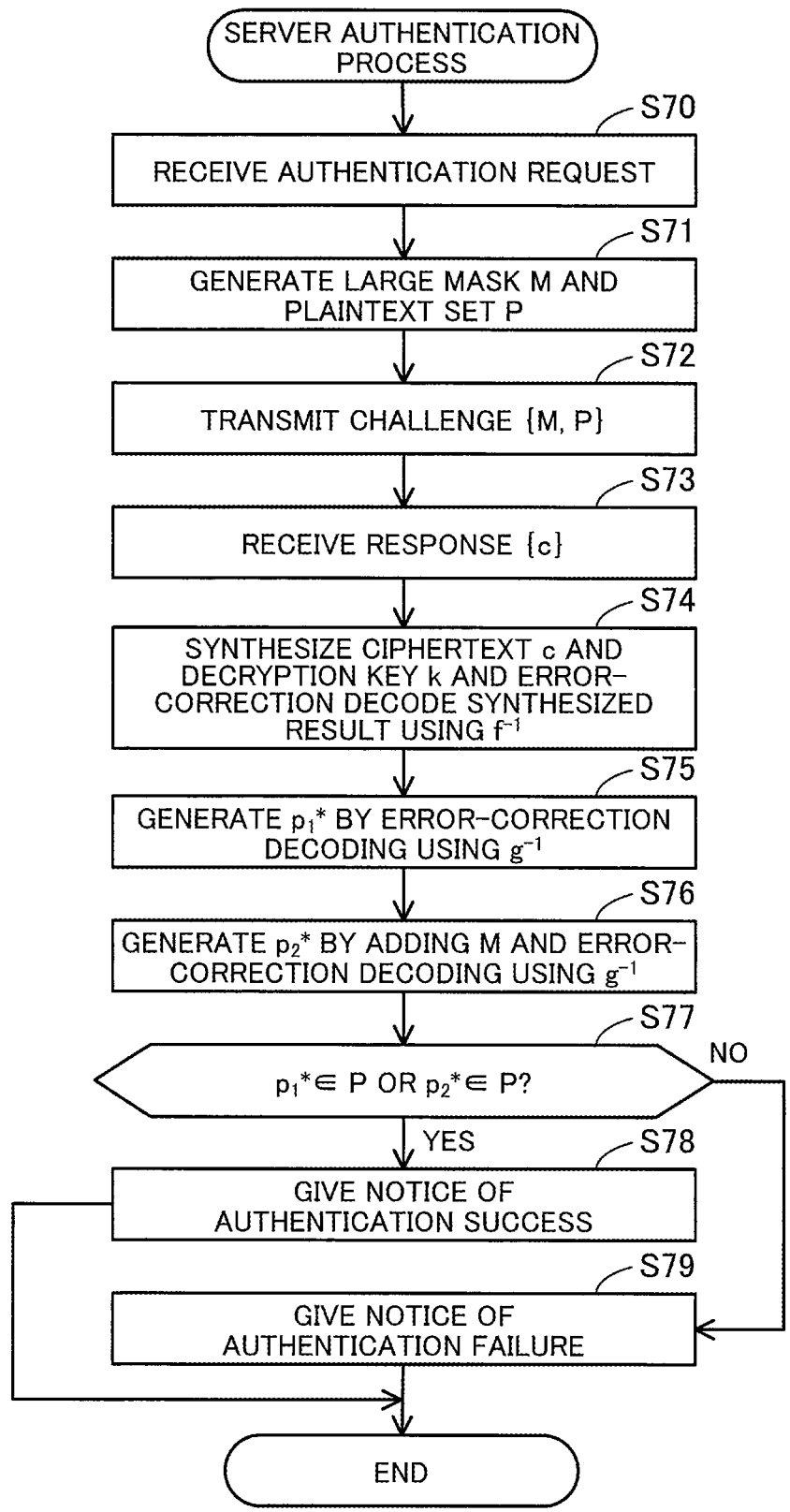
FIG. 14 is a flowchart illustrating a procedure example of a second server authentication process.

FIG. 14 is a flowchart illustrating a procedure example of a second server authentication process.

(Step S70) The confidential information extracting unit 132 receives an authentication request.

(Step S71) The confidential information extracting unit 132 extracts, from the database 120, the small mask m included in the template of an authentication target user. The confidential information extracting unit 132 generates the large mask M depending on the small mask m. Bits with a value of 1 in the small mask m also have a value of 1 in the large mask M. In addition, the Hamming weight of the large mask M does not exceed 2θ+1. The generated large mask M is randomly selected from a range satisfying the foregoing conditions. In addition, the confidential information extracting unit 132 randomly generates the plaintext set P.

(Step S72) The confidential information extracting unit 132 transmits, to the client device 200, a challenge including the large mask M and information defining the plaintext set P.

(Step S73) The confidential information extracting unit 132 receives, from the client device 200, a response including the ciphertext c as a reply to the challenge.

(Step S74) The confidential information extracting unit 132 extracts, from the database 120, the decryption key k included in the template of the authentication target user. The confidential information extracting unit 132 synthesizes the ciphertext c included in the response and the decryption key k extracted from the template. For example, the confidential information extracting unit 132 subtracts the decryption key k from the ciphertext c. The subtraction is, for example, an operation of performing a bitwise exclusive OR of the ciphertext c and the decryption key k. The confidential information extracting unit 132 error-correction decodes the synthesized bit string using the decoding function $f^{-1}$.

(Step S75) The confidential information extracting unit 132 implements the first decoding path using the decoded result of step S74. That is, the confidential information extracting unit 132 further error-correction decodes the decoded result of step S74 using the decoding function $g^{-1}$ to thereby generate the decoded result $p_1^*$.

(Step S76) The confidential information extracting unit 132 implements the second decoding path using the decoded result of step S74. That is, the confidential information extracting unit 132 adds the large mask M of step S71 to the decoded result of step S74. The addition is, for example, an operation of performing a bitwise exclusive OR of the decoded result and the large mask M. The confidential information extracting unit 132 further error-correction decodes the bit string obtained by the addition of the large mask M using the decoding function $g^{-1}$ to thereby generate the decoded result $p_2^*$.

(Step S77) The verifying unit 133 determines whether either one of the decoded result $p_1^*$ of step S75 and the decoded result $p_2^*$ of step S76 belongs to the plaintext set P of step S71. If one of the decoded results $p_1^*$ and $p_2^*$ belongs to the plaintext set P, the process moves to step S78. If neither one of the decoded results $p_1^*$ and $p_2^*$ belongs to the plaintext set P, the process moves to step S79.

(Step S78) The verifying unit 133 determines that the authentication succeeds. The verifying unit 133 transmits an authentication result indicating authentication success to the client device 200.

(Step S79) The verifying unit 133 determines that the authentication fails. The verifying unit 133 transmits an authentication result indicating authentication failure to the client device 200.

According to the cryptographic data processing system of the third embodiment, it is possible to achieve similar security in challenge-response authentication to that provided according to the second embodiment.

(d) Fourth Embodiment

The second and third embodiments are mainly concerned with the case where data dealt with is in binary form. According to the forth embodiment, on the other hand, the cryptographic processing algorithms of the second and third embodiments are generalized, assuming that data dealt with is in vector form over a finite field $F_q$ of positive characteristic q. In the following description, a cryptographic processing algorithm with q=corresponds to those in the second and third embodiments. Note that the term "correctable bit count" is used in the second and third embodiments because the data dealt with is in binary form; however, the term "correctable error count" is used instead in the fourth embodiment. The correctable error count may also be referred to as "correctable digit number". The "correctable bit count" of the second and third embodiments is a type of "correctable error count" or "correctable digit number".

The Hamming weight of the mask M used in the cryptographic processing algorithm satisfies Expression (23). The first term in Expression (23) indicates that the Hamming weight of the mask M is sufficiently greater than the correctable error count θ of the decoding function $g^{-1}$. Note that nonzero elements of the mask M may be limited to particular nonzero elements of the finite field $F_q$. The following restrictions are applied to the masked random number R(M). Nonzero elements in the masked random number R(M) are limited to those in the mask M. As for decoding paths, the following q decoding paths are prepared so as to correspond to each element x of the finite field $F_q$. In subtracting the decryption key k from the ciphertext c and error-correction decoding the subtraction result, the product xM of the element x and the mask M is added to the decoded result $f^{-1}(c-k)$, and error-correction decoding is performed on the addition result using the decoding function $g^{-1}$.

$$(\theta << |M|) \wedge (|M| - \lceil |M|/q \rceil \leq \theta) \qquad (23)$$

In the case where the biometric code used in decoding is valid and the mask is valid, at least one of the q decoded results matches the confidential information p. Each of |M| components which are obviously nonzero in a vector represented by $R(M) - R^*(M) + xM$ takes a value of 0 only when the element x is equal to a value of i. If the number of such components is denoted by $n_i$, Expression (24) is true. When I denotes i that maximizes $n_i$, Expression (25) is true. In this case, the Hamming weight of $R(M) - R^*(M)$ is $|M| - n_I$, and therefore the second term in Expression (23) is true. As a result, the Hamming weight of $R(M) - R^*(M) + xM$ does not exceed the correctable error count θ, and the decoded result obtained after the error-correction decoding using the decoding function $g^{-1}$ matches the confidential information p.

$$\sum_{i \in F_q} n_i = |M| \qquad (24)$$

-continued $$\lceil |M|/q \rceil \leq n_l \quad (25)$$

In the case where the mask M used in encoding is different from the mask M* used in decoding, on the other hand, none of the q decoded results matches the confidential information p. The vector represented by R(M)−R*(M)+xM includes |M∪M*| to 2|M| components which are obviously nonzero. Amongst the |M∪M*| to 2|M| components, about |M*|×(q−1)/q components are nonzero regardless of the value of x. In addition, amongst the remaining components, about |M|×(q−1)/q components are nonzero for each element x. Therefore, the Hamming weight of R(M)−R*(M)+xM is about 2(q−1)×|M|/q. This Hamming weight exceeds the correctable error count θ, and the decoded result does not match the confidential information p.

According to the cryptographic data processing system of the fourth embodiment, it is possible to achieve similar security to that provided according to the second and third embodiments when data dealt with is in, not binary form, but vector form over the finite field $F_q$ of positive characteristic q. Note that the cryptographic data processing system of the fourth embodiment may be implemented using similar hardware and software configuration to that of the cryptographic data processing systems of the second and third embodiments.

According to one aspect, it is possible to enhance the protection of a plurality of ciphertexts pertaining to the same person.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A cryptographic data processing method comprising:
selecting, by an information processing system including a processor, a first mask amongst a plurality of masks;
generating, by the information processing system, a first masked random number by performing a bitwise AND operation between a bit string of a first random number and a bit string of the first mask, and generating a first key from the first masked random number and a first biometric code generated from biometric information, and also causing mask information indicating the selected first mask to be stored;
generating, by the information processing system, a second masked random number by performing a bitwise AND operation between a bit string of a second random number and the bit string of the first mask indicated by the mask information or between the bit string of the second random number and a bit string of a second mask having a predetermined relationship with the first mask, and generating a second key from the second masked random number and a second biometric code;
generating, by the information processing system, a ciphertext using one of the first key and the second key and an error-correction encoding method; and
decoding the ciphertext using another one of the first key and the second key and a decoding method corresponding to the error-correction encoding method, wherein:
the generating the first key includes encoding the first masked random number using a different error-correction encoding method to generate an encoded result, and synthesizing the encoded result and the first biometric code to generate the first key,
the generating the second key includes encoding the second masked random number using the different error-correction encoding method to generate another encoded result, and synthesizing the another encoded result and the second biometric code to generate the second key,
the ciphertext is generated by encoding confidential information using the error-correction encoding method and the different error-correction encoding method to generate encoded confidential information, and synthesizing the encoded confidential information and the one of the first key and the second key, and
the decoding the ciphertext includes synthesizing the ciphertext and the another one of the first key and the second key and implementing a different decoding method corresponding to the different error-correction encoding method and then the decoding method.

2. A cryptographic data processing method comprising:
selecting, by an information processing system including a processor, a first mask amongst a plurality of masks;
generating, by the information processing system, a first masked random number by performing a bitwise AND operation between a bit string of a first random number and a bit string of the first mask, and generating a first key from the first masked random number and a first biometric code generated from biometric information, and also causing mask information indicating the selected first mask to be stored;
generating, by the information processing system, a second masked random number by performing a bitwise AND operation between a bit string of a second random number and the bit string of the first mask indicated by the mask information or between the bit string of the second random number and a bit string of a second mask having a predetermined relationship with the first mask, and generating a second key from the second masked random number and a second biometric code; and
generating, by the information processing system, a ciphertext using one of the first key and the second key and an error-correction encoding method,
wherein a number of nonzero bits in each of the masks is greater than a correctable bit count of the error-correction encoding method but equal to or less than a bit count obtained by adding 1 to twice the correctable bit count.

3. A cryptographic data processing method comprising:
selecting, by an information processing system including a processor, a first mask amongst a plurality of masks;
generating, by the information processing system, a first masked random number by performing a bitwise AND operation between a bit string of a first random number and a bit string of the first mask, and generating a first key from the first masked random number and a first biometric code generated from biometric information, and also causing mask information indicating the selected first mask to be stored;
generating, by the information processing system, a second masked random number by performing a bitwise AND operation between a bit string of a second random number and the bit string of the first mask indicated by the mask information or between the bit string of the second random number and a bit string of a second mask having a predetermined relationship with the first mask, and generating a second key from the second masked random number and a second biometric code;

generating, by the information processing system, a ciphertext using one of the first key and the second key and an error-correction encoding method; and decoding the ciphertext using another one of the first key and the second key and a decoding method corresponding to the error-correction encoding method, wherein the decoding the ciphertext includes implementing first decoding which uses neither the first mask nor the second mask and second decoding which further uses the first mask or the second mask, and determining authentication success when one of the first decoding and the second decoding succeeds.

4. The cryptographic data processing method according to claim 1, wherein:

the decoding the ciphertext includes generating intermediate data by synthesizing the ciphertext and the another one of the first key and the second key to generate a synthesized result and decoding the synthesized result using the different decoding method, implementing first decoding that decodes the intermediate data using the decoding method and second decoding that synthesizes the intermediate data and the first mask or the second mask to generate a different synthesized result and decodes the different synthesized result using the decoding method, and determining authentication success when one of the first decoding and the second decoding succeeds.

5. A cryptographic data processing apparatus comprising:
an interface configured to acquire biometric information; and
a processor configured to perform a procedure including:
selecting a first mask amongst a plurality of masks,
generating a first masked random number by performing a bitwise AND operation between a bit string of a first random number and a bit string of the first mask, and generating a first key from the first masked random number and a first biometric code generated from the biometric information, and also causing mask information indicating the selected first mask to be stored,
generating a second masked random number by performing a bitwise AND operation between a bit string of a second random number and the bit string of the first mask indicated by the mask information or between the bit string of the second random number and a bit string of a second mask having a predetermined relationship with the first mask, and generating a second key from the second masked random number and a second biometric code,
generating a ciphertext using one of the first key and the second key and an error-correction encoding method, and
decoding the ciphertext using another one of the first key and the second key and a decoding method corresponding to the error-correction encoding method, wherein:
the generating the first key includes encoding the first masked random number using a different error-correction encoding method to generate an encoded result, and synthesizing the encoded result and the first biometric code to generate the first key,
the generating the second key includes encoding the second masked random number using the different error-correction encoding method to generate another encoded result, and synthesizing the another encoded result and the second biometric code to generate the second key,
the ciphertext is generated by encoding confidential information using the error-correction encoding method and the different error-correction encoding method to generate encoded confidential information, and synthesizing the encoded confidential information and the one of the first key and the second key, and
the decoding the ciphertext includes synthesizing the ciphertext and the another one of the first key and the second key and implementing a different decoding method corresponding to the different error-correction encoding method and then the decoding method.

6. A non-transitory computer-readable storage medium storing a computer program that causes a computer to perform a procedure comprising:
selecting a first mask amongst a plurality of masks;
generating a first masked random number by performing a bitwise AND operation between a bit string of a first random number and a bit string of the first mask, and generating a first key from the first masked random number and a first biometric code generated from biometric information, and also causing mask information indicating the selected first mask to be stored;
generating a second masked random number by performing a bitwise AND operation between a bit string of a second random number and the bit string of the first mask indicated by the mask information or between the bit string of the second random number and a bit string of a second mask having a predetermined relationship with the first mask, and generating a second key from the second masked random number and a second biometric code;
generating a ciphertext using one of the first key and the second key and an error-correction encoding method, and
decoding the ciphertext using another one of the first key and the second key and a decoding method corresponding to the error-correction encoding method, wherein:
the generating the first key includes encoding the first masked random number using a different error-correction encoding method to generate an encoded result, and synthesizing the encoded result and the first biometric code to generate the first key,
the generating the second key includes encoding the second masked random number using the different error-correction encoding method to generate another encoded result, and synthesizing the another encoded result and the second biometric code to generate the second key,
the ciphertext is generated by encoding confidential information using the error-correction encoding method and the different error-correction encoding method to generate encoded confidential information, and synthesizing the encoded confidential information and the one of the first key and the second key, and
the decoding the ciphertext includes synthesizing the ciphertext and the another one of the first key and the second key and implementing a different decoding method corresponding to the different error-correction encoding method and then the decoding method.

* * * * *